US011483564B2

(12) United States Patent
Lee

(10) Patent No.: US 11,483,564 B2
(45) Date of Patent: Oct. 25, 2022

(54) METHOD AND APPARATUS FOR VIDEO SIGNAL PROCESSING DETERMINING REFERENCE SAMPLE LINES FOR A PREDICTION TARGET SAMPLE

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 85 days.

(21) Appl. No.: 16/981,559

(22) PCT Filed: Mar. 15, 2019

(86) PCT No.: PCT/KR2019/003044
§ 371 (c)(1),
(2) Date: Sep. 16, 2020

(87) PCT Pub. No.: WO2019/182292
PCT Pub. Date: Sep. 26, 2019

(65) Prior Publication Data
US 2021/0021832 A1  Jan. 21, 2021

(30) Foreign Application Priority Data
Mar. 19, 2018 (KR) .......................... 10-2018-0031544

(51) Int. Cl.
H04N 19/105 (2014.01)
H04N 19/132 (2014.01)
H04N 19/159 (2014.01)
H04N 19/176 (2014.01)
H04N 19/189 (2014.01)

(52) U.S. Cl.
CPC ......... *H04N 19/132* (2014.11); *H04N 19/105* (2014.11); *H04N 19/159* (2014.11); *H04N 19/176* (2014.11); *H04N 19/189* (2014.11)

(58) Field of Classification Search
CPC .. H04N 19/132; H04N 19/105; H04N 19/159; H04N 19/176; H04N 19/189; H04N 19/11; H04N 19/157; H04N 19/122; H04N 19/593
USPC ......................................... 375/240
See application file for complete search history.

(56) References Cited

U.S. PATENT DOCUMENTS

| 11,128,862 | B2* | 9/2021 | Cho ................... H04N 19/105 |
| 2011/0293001 | A1 | 12/2011 | Lim et al. |
| 2013/0272405 | A1 | 10/2013 | Jeon et al. |
| 2013/0329794 | A1 | 12/2013 | Jeon et al. |
| 2014/0056352 | A1 | 2/2014 | Park et al. |

(Continued)

FOREIGN PATENT DOCUMENTS

KR 10-1781874 B1 9/2017
WO 2012/148138 A2 11/2012

(Continued)

*Primary Examiner* — Susan E. Torgerson
(74) *Attorney, Agent, or Firm* — IP Legal Services, LLC

(57) ABSTRACT

According to the present invention, there is provided a method of decoding an image, the method including: determining an intra prediction mode of a current block; determining a reference sample line for a prediction target sample included in the current block; and obtaining a prediction value of the prediction target sample on the basis of the intra prediction mode and the reference sample line.

12 Claims, 17 Drawing Sheets

(56) References Cited

U.S. PATENT DOCUMENTS

| | | | |
|---|---|---|---|
| 2014/0321542 A1 | 10/2014 | Lim et al. | |
| 2014/0328397 A1 | 11/2014 | Jeon et al. | |
| 2015/0229965 A1 | 8/2015 | Park et al. | |
| 2016/0330478 A1 | 11/2016 | Jeon et al. | |
| 2017/0280157 A1 | 9/2017 | Jeon et al. | |
| 2017/0316276 A1 | 11/2017 | Lim et al. | |
| 2017/0347118 A1 | 11/2017 | Jeon et al. | |
| 2018/0124426 A1 | 5/2018 | Jeon et al. | |
| 2018/0352222 A1* | 12/2018 | Liu | H04N 19/182 |
| 2019/0089980 A1 | 3/2019 | Jeon et al. | |
| 2019/0104304 A1 | 4/2019 | Lee et al. | |
| 2019/0166375 A1* | 5/2019 | Jun | H04N 19/13 |
| 2019/0174142 A1 | 6/2019 | Jeon et al. | |
| 2019/0182481 A1 | 6/2019 | Lee | |
| 2019/0222837 A1* | 7/2019 | Lee | H04N 19/44 |
| 2019/0385002 A1 | 12/2019 | Lim et al. | |
| 2020/0228829 A1 | 7/2020 | Jeon et al. | |
| 2020/0228835 A1 | 7/2020 | Park et al. | |

FOREIGN PATENT DOCUMENTS

| | | |
|---|---|---|
| WO | 2014/010943 A1 | 1/2014 |
| WO | 2017/160117 A1 | 9/2017 |
| WO | 2018/026219 A1 | 2/2018 |

* cited by examiner

Region to which bi-directional intra prediction is applied

Region to which bi-directional intra prediction is applied

METHOD AND APPARATUS FOR VIDEO SIGNAL PROCESSING DETERMINING REFERENCE SAMPLE LINES FOR A PREDICTION TARGET SAMPLE

CROSS REFERENCE TO RELATED APPLICATIONS

This application is a National Stage Patent Application of PCT International Patent Application No. PCT/KR2019/003044 (filed on Mar. 15, 2019) under 35 U.S.C. § 371, which claims priority to Korean Patent Application No. 10-2018-0031544 (filed on Mar. 19, 2018), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter prediction technique of predicting a pixel value included in a current picture from a previous or subsequent picture of the current picture; an intra prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is intended to provide a method and an apparatus for efficiently performing intra prediction for an encoding/decoding target block in encoding/decoding a video signal.

An object of the present invention is intended to provide a method and an apparatus for performing intra prediction using a plurality of reference samples in encoding/decoding a video signal.

An object of the present invention is intended to provide a method and an apparatus for performing intra prediction using right and bottom reference samples.

An object of the present invention is to provide a method and an apparatus for performing intra prediction using at least one of multiple reference sample lines in encoding/decoding a video signal.

An object of the present invention is to provide a method and an apparatus for constructing multiple reference samples on the basis of reference samples adjacent to the left/right, and the upper/lower part of a current block in encoding/decoding a video signal.

The technical objects to be achieved by the present invention are not limited to the above-mentioned technical problems. And, other technical problems that are not mentioned will be apparently understood to those skilled in the art from the following description.

Technical Solution

According to the present invention, there is provided a method and an apparatus for decoding a video signal, wherein an intra prediction mode of a current block is determined, a reference sample line for a prediction target sample included in the current block is determined, and a prediction value of the prediction target sample is acquired on the basis of the intra prediction mode and the reference sample line.

According to the present invention, there is provided a method and an apparatus for encoding a video signal, wherein an intra prediction mode of a current block is determined, a reference sample line for a prediction target sample included in the current block is determined, and a prediction value of the prediction target sample is acquired on the basis of the intra prediction mode and the reference sample line.

In the method and the apparatus for encoding/decoding the video signal according to the present invention, the determining of the reference sample line may be performed on the basis of a position of the prediction target sample or whether the prediction target sample is included in a predetermined region.

In the method and the apparatus for encoding/decoding the video signal according to the present invention, the determining of the reference sample line may be performed on the basis of a result of comparing a distance from the position of the prediction target sample to a first reference sample included in a first reference sample line, and a distance from the position of the prediction target sample to a second reference sample included in a second reference sample line.

In the method and the apparatus for encoding/decoding the video signal according to the present invention, the first reference sample and the second reference sample may be determined on the basis of the intra prediction mode.

In the method and the apparatus for encoding/decoding the video signal according to the present invention, the first reference sample line may include a top reference sample included in a row adjacent to a top of the current block, and a left reference sample included in a column adjacent to a left side of the current block, and the second reference sample line may include a right reference sample included in a column adjacent to a right side of the current block, and a bottom reference sample included in a row adjacent to a bottom of the current block.

In the method and the apparatus for encoding/decoding the video signal according to the present invention, the prediction value may be calculated on the basis of a weighted sum operation or an average operation between a first reference sample included in a first reference sample line and a second reference sample included in a second reference sample line.

In the method and the apparatus for encoding/decoding the video signal according to the present invention, weights applied to a first reference sample and a second reference sample, respectively, may be determined on the basis of a distance to the prediction target sample.

In the method and the apparatus for encoding/decoding the video signal according to the present invention, weights applied to a first reference sample and a second reference sample, respectively, may be determined on the basis of a distance to the prediction target sample.

In the method and the apparatus for encoding/decoding the video signal according to the present invention, the determining of the reference sample line may include determining whether to use multiple reference sample lines.

It is to be understood that the foregoing summarized features are exemplary aspects of the following detailed description of the present invention without limiting the scope of the present invention.

Advantageous Effects

According to the present invention, an efficient intra prediction may be performed for an encoding/decoding target block.

According to the present invention, there is an advantage of increasing the efficiency of intra prediction by performing intra prediction using a plurality of reference samples that is not adjacent to each other.

According to the present invention, there is an advantage that the efficiency of intra prediction can be improved by using the right and bottom reference samples.

According to the present invention, the efficiency of intra prediction may be increased by selecting and using at least one of multiple reference sample lines.

According to the present invention, a reference sample line is constructed using reference samples adjacent to the left side/top of the current block as well as reference samples adjacent to the right side/bottom of the current block, thereby increasing the efficiency of intra prediction.

The effects obtainable by the present invention are not limited to the above-mentioned effects, and other effects not mentioned can be clearly understood by those skilled in the art from the description below.

MODE FOR INVENTION

Figure 1:
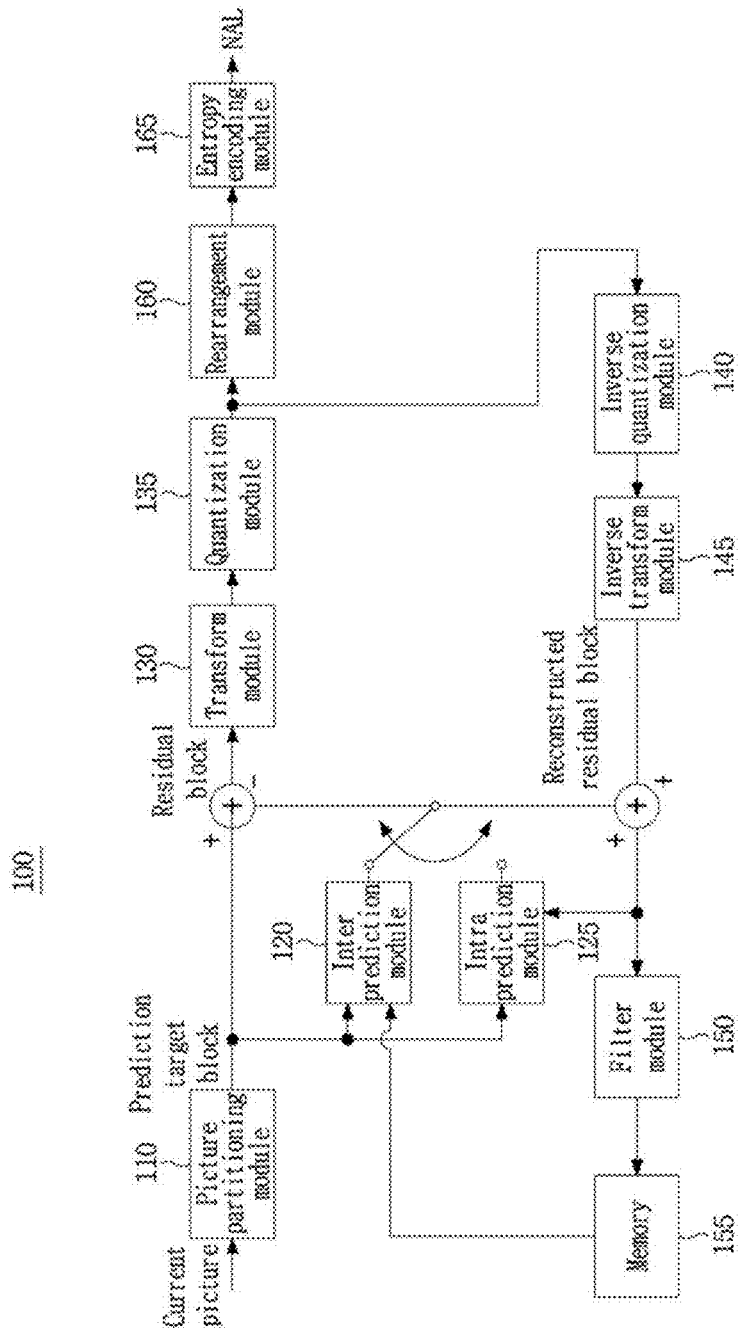
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video, and does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be partitioned into a plurality of constitutional parts to perform each function. The embodiment where each constitutional part is combined and the embodiment where one constitutional part is partitioned are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of a plurality of coding units, prediction units, and transform units, and may encode a picture by selecting one combination of coding units, prediction units, and transform units with a predetermined criterion (e.g., cost function).

For example, one picture may be partitioned into a plurality of coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so that one prediction unit of prediction units partitioned in a single coding unit have a different shape and/or size from other prediction unit.

When a prediction unit performing intra prediction based on a coding unit is generated and the coding unit is not the smallest coding unit, intra prediction may be performed without partitioning the coding unit into a plurality of prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit performing prediction may be different from the processing unit for which the prediction method and detailed content is determined. For example, the prediction method, the prediction mode, etc. may be determined on the basis of the prediction unit, and prediction may be performed on the basis of the transform unit. A residual value (residual block) between the generated prediction block and an original block may be input to the transform module 130. Also, prediction mode information, motion vector information, etc. used for prediction may be encoded with the residual value in the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel on the basis of a ¼ pixel. In the case of chroma signals, a 4-tap DCT-based interpolation filter having different filter coefficient may be used to generate pixel information of an integer pixel or less than an integer pixel on the basis of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value on the basis of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when a size of the prediction unit is the same as a size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. A type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on a size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, or an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture on the basis of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be partitioned into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
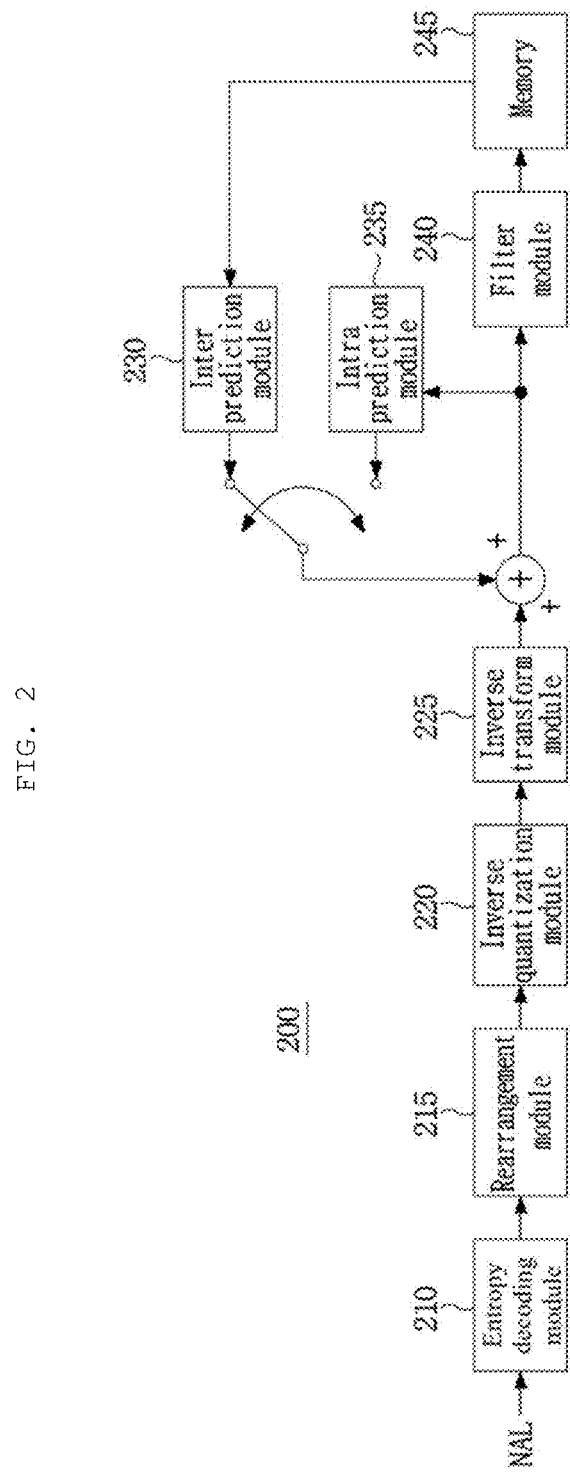
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on a plurality of pieces of information, such as the prediction method, a size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when a size of the prediction unit is the same as a size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may partition a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on a type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by partitioned into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be partitioned into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively partitioned or partitioned into base units for performing prediction, quantization, transform, or in-loop filtering, or the like. For example, a partition of arbitrary size generated by dividing the coding unit may be defined as a coding unit, or may be defined as a transform unit or a prediction unit, which is a base unit for performing prediction, quantization, transform, in-loop filtering, or the like.

Partitioning of a coding tree unit or a coding unit may be performed based on at least one of the vertical line or the horizontal line. In addition, the number of vertical lines or horizontal lines partitioning the coding tree unit or the coding unit may be at least one or more. For example, the coding tree unit or the coding unit may be partitioned into two partitions using one vertical line or one horizontal line, or the coding tree unit or the coding unit may be partitioned into three partitions using two vertical lines or two horizontal lines. Alternatively, the coding tree unit or the coding unit may be partitioned into four partitions having a length and the width of ½ by using one vertical line and one horizontal line.

When a coding tree unit or a coding unit is partitioned into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is partitioned into a quad tree structure, a triple tree structure, or a binary tree structure. However, it is also possible to partition a coding tree unit or a coding unit using a larger number of vertical lines or a larger number of horizontal lines.

Figure 3:
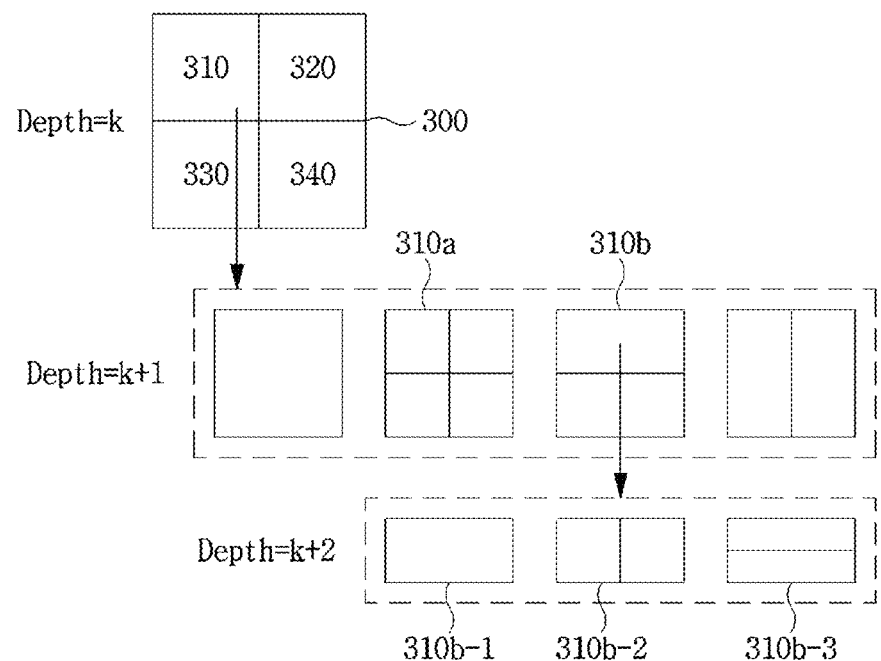
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure as an embodiment to which the present invention is applied.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined on the basis of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree, a triple tree, or a binary tree. Here, quad tree-based partitioning may mean that a 2N×2N coding block is partitioned into four N×N coding blocks, triple tree-based partitioning may mean that one coding block is partitioned into three coding blocks, and binary-based partitioning may mean that one coding block is partitioned into two coding blocks. Even if the triple-based partitioning or the binary tree-based partitioning is performed, a square-shaped coding block may exist in the lower depth. Also, after the triple-based partitioning or the binary-based partitioning is performed, generating a square-shaped coding block may be limited in a lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. At least one of quad tree-based partitioning, triple tree-based partitioning, or binary tree-based partitioning may no longer be performed on the coding block partitioned based on the binary tree.

Alternatively, the triple tree-based partitioning or the binary tree-based partitioning may be allowed for the coding block partitioned based on the binary tree, but only one of the horizontal or vertical partitioning may be limitedly allowed.

For example, an additional partition or an additional partition direction may be limited for a coding block partitioned based on the binary tree according to a location, an index, a shape, or an additional partition type of a neighboring partition of the coding block partitioned based on the binary tree, or the like. For example, when an index of the coding block that precedes the coding order among the two coding blocks generated by the binary tree based-partitioning is 0 (hereinafter referred to as coding block index 0) and an index of the coding block that follows the coding order among the two coding blocks generated by the binary tree-based partitioning is 1 (hereinafter referred to as coding block index 1), in the case where the binary tree-based partitioning is applied to all coding blocks having a coding block index of 0 or a coding block index of 1, the binary tree-based partitioning direction of the coding block having the coding block index of 1 may be determined according to a binary tree-based partitioning direction of the coding block having the coding block index of 0. Specifically, when the binary tree-based partitioning direction of the coding block having the coding block index of 0 is to partition the coding block having the coding block index of 0 into square partitions, binary tree-based partitioning of the coding block having the coding block index of 1 may be limited to have a different direction from binary tree-based partitioning of the coding block having a coding block index of 1. Thus, the coding blocks having the coding block index of 0 and the coding block index of 1 may be restricted from being partitioned into square partitions. In this case, encoding/decoding of information indicating the binary tree partitioning direction of the coding block having the coding block index of 1 may be omitted. This is because partitioning all of the coding blocks having the coding block index of 0 and the coding block index of 1 into square partitions has the same effect as partitioning the upper depth block on the basis of a quad tree, so that allowing partitioning of all into square partitions is undesirable in terms of coding efficiency.

Triple tree-based partitioning means partitioning a coding block into three partitions in the horizontal or vertical direction. All three partitions generated due to triple tree-based partitioning may have different sizes. Alternatively, two of the partitions generated due to triple tree-based partitioning may have the same size, and the other one may have a different size. For example, the width ratio or height ratio of partitions generated as the coding block is partitioned may be set to 1:n:1, 1:1:n, n:1:1 or m:n:1 depending on the partitioning direction. Here, m and n may be 1 or a real number greater than 1, for example, an integer such as 2.

Triple tree-based partitioning may be performed on a coding block in which quad tree-based partitioning is no longer performed. For the coding block partitioned based on the triple tree, at least one of quad tree-based partitioning, triple tree-based partitioning, or binary tree-based partitioning may be set to no longer be performed.

Alternatively, triple tree-based partitioning or binary tree-based partitioning may be allowed for the coding block partitioned based on the triple tree, but only one of horizontal or vertical partitioning may be limitedly allowed.

For example, an additional partition or an additional partition direction may be limited for a coding block partitioned based on the triple tree according to a location, an index, a shape, or an additional partition type of a neighboring partition of the coding block partitioned based on the triple tree, or the like. For example, one of horizontal division or vertical division may be limited to a partition having the largest size among coding blocks generated due to triple tree-based partitioning. Specifically, the largest partition among coding blocks generated due to triple tree-based partitioning may not allow binary tree partitioning in the same direction or triple tree partitioning direction in the same direction as the triple tree partitioning direction of the upper depth partition. In this case, encoding/decoding of information indicating the binary tree partitioning direction or the triple tree partitioning direction may be omitted for the largest partition among the coding blocks partitioned based on the triple tree.

Partitioning based on a binary tree or a triple tree may not be allowed according to a size or a shape of a current block. Here, the size of the current block may be expressed based on at least one of a width, a height of the current block, a minimum/maximum of the width/height, a sum of the width and the height, a product of the width and height, or the number of samples included in the current block. For example, when at least one of the width or the height of the current block is greater than a pre-defined value, partitioning based on a binary tree or a triple tree may not be allowed. Herein, the pre-defined value may be an integer such as 16, 32, 64, or 128. As another example, when a width-to-height ratio of the current block is greater than a pre-defined value or smaller than a pre-defined value, partitioning based on a binary tree or a triple tree may not be allowed. When the predefined value is 1, partitioning based on a binary tree or triple tree may be allowed only when the current block is a square block having the same width and height.

The partitioning in the lower depth may be determined depending on the partitioning type of the upper depth. For example, when binary tree-based partitioning is allowed in two or more depths, only a binary tree-based partitioning of the same type as a binary tree partitioning of an upper depth may be allowed in a lower depth. For example, when the binary tree-based partitioning is performed in the 2N×N type in the upper depth, the binary tree-based partitioning in the 2N×N type may be performed in the lower depth. Alternatively, when binary tree-based partitioning is performed in an N×2N type in an upper depth, N×2N-type binary tree-based partitioning may be allowed in a lower depth.

Conversely, it is also possible to allow only binary tree-based partitioning having a different type from the binary tree partitioning of the upper depth in the lower depth.

For a sequence, a slice, a coding tree unit, or a coding unit, it may be limited to use only a special type of binary tree-based partitioning or a special type of triple tree-based partitioning. For example, it may be limited to allow only 2N×N or N×2N type binary tree-based partitioning for a coding tree unit. The allowed partitioning type may be predefined in the encoder or the decoder, and information about the allowed partitioning type or the not allowed partitioning type may be encoded and signaled through a bitstream.

Figure 5A:
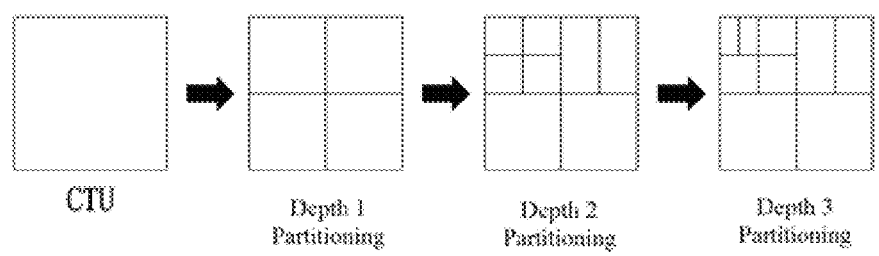
FIGS. 5A and 5B are diagrams illustrating an example in which only a binary tree-based partition of a pre-determined type is allowed according to an embodiment of the present invention.
Figure 5B:
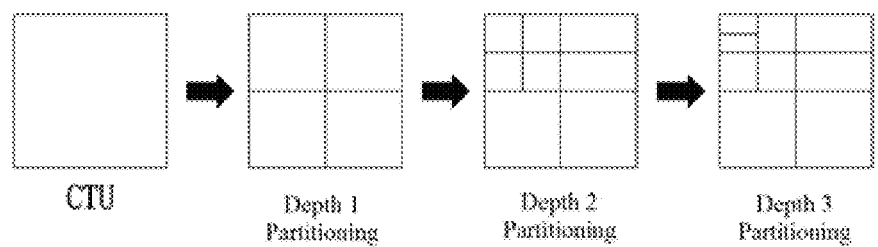

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on a size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in the vertical direction or the horizontal direction, etc. may be used.

In addition, information on the number of times a binary/triple tree partitioning is allowed, a depth in which the binary/triple tree partitioning is allowed, or the number of the depths in which the binary/triple tree partitioning is allowed may be obtained for a coding tree unit or a specific coding unit. The information may be encoded on the basis of a coding tree unit or a coding unit, and may be transmitted to a decoder through a bitstream.

For example, a syntax 'max_binary_depth_idx_minus1' indicating a maximum depth in which binary tree partitioning is allowed may be encoded/decoded through a bitstream. In this case, max_binary_depth_idx_minus1+1 may indicate the maximum depth in which the binary tree partitioning is allowed.

Figure 6:
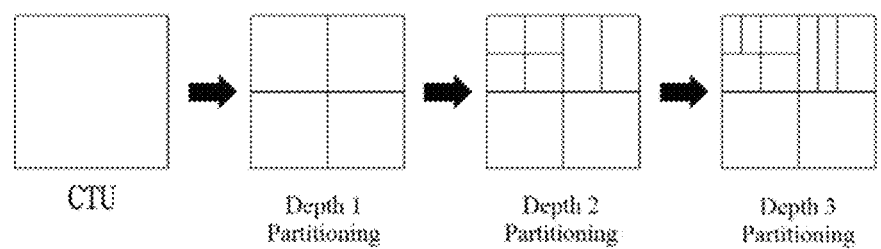
FIG. 6 is a diagram for explaining an example in which information related to the allowable number of binary tree partitioning is encoded/decoded, according to an embodiment to which the present invention is applied.

Referring to an example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth in which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary/triple tree partitioning is allowed, the depth in which the binary/triple tree partitioning is allowed, or the number of the depths in which the binary/triple tree partitioning is allowed may be obtained for each sequence or each slice. For example, the information may be encoded on the basis of a sequence, a picture, or a slice unit and transmitted through a bitstream. In contrast, a depth in which the binary/triple tree partitioning is allowed, or the number of the depths in which the binary/triple tree partitioning is allowed may be defined for each a sequence, a picture, or a slice unit. Accordingly, at least one of the number of the binary/triple tree partitioning in the first slice and the second slice, the maximum depth in which the binary/triple tree partitioning is allowed in the first slice and the second slice, or the number of depths in which the binary/triple tree partitioning is performed in the first slice and the second slice may be difference from a second slice. For example, in the first slice, binary tree partitioning may be allowed for only one depth, while in the second slice, binary tree partitioning may be allowed for two depths.

As another example, the number of times the binary/triple tree partitioning is allowed, the depth in which the binary/triple tree partitioning is allowed, or the number of depths in which the binary/triple tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into a plurality of second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into a plurality of third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning or the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of the horizontal direction or the vertical direction depending on a partitioning direction, and the partitioning direction may be determined based on the information on whether binary tree-based partitioning is performed in the vertical direction or the horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of the vertical direction or coding blocks 310b-3 of the horizontal direction based on the binary tree, and the partition depth of the relevant coding blocks may be increased to k+3. Alternatively, the third coding block 310b may be determined as a leaf coding block 310 b-1 that is no longer partitioned based on the binary tree. In this case, the coding block 310b-1 may be used as a prediction block or a transform block. However, the above partitioning process may be limitedly performed based on at least one of the information on a size/depth of the coding block that quad tree-based partitioning is allowed, the information on the size/depth of the coding block that binary tree-based partitioning is allowed, or the information on the size/depth of the coding block that binary tree-based partitioning is not allowed.

A number of a candidate that represent a size of a coding block may be limited to a predetermined number, or the size of the coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree, a binary tree and a triple tree, a coding unit may be represented as square or rectangular shape of an arbitrary size.

A coding block may be encoded/decoded using at least one of a skip mode, an intra prediction, an inter prediction, or a skip method.

As another example, intra prediction or inter prediction may be performed on the same size as a coding block or a unit smaller than the coding block generated by partitioning the coding block. Once a coding block is determined, a prediction block may be determined through predictive partitioning of the coding block. The predictive partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
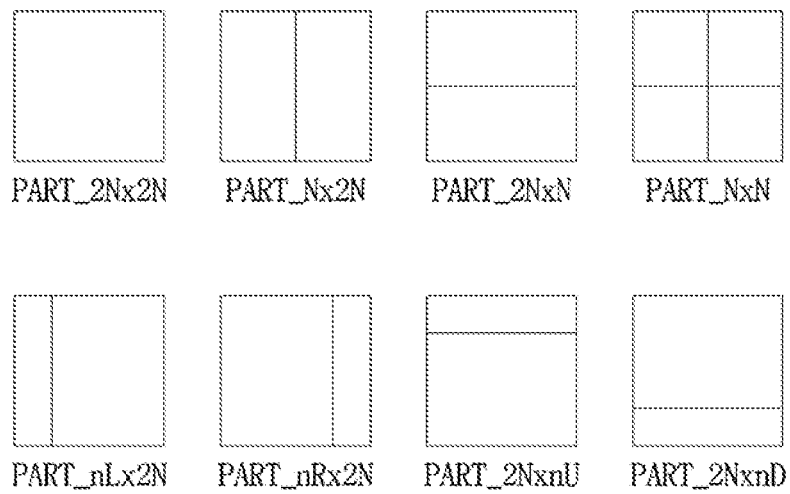
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
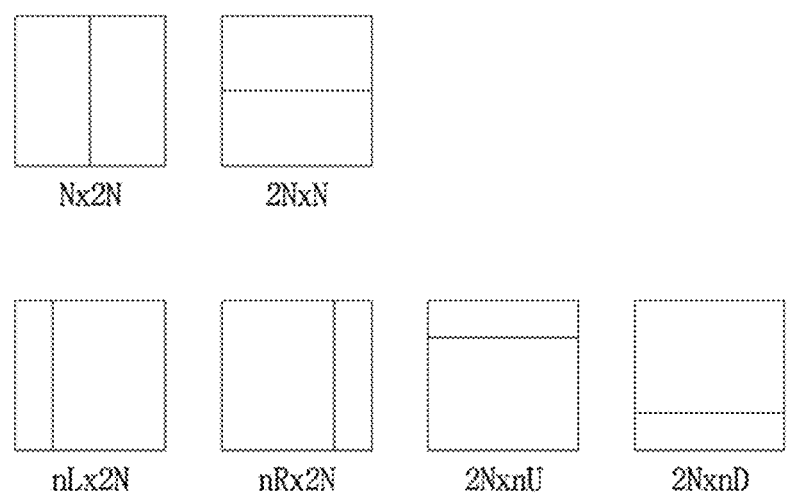
FIG. 4 is a diagram illustrating a partition type in which binary tree-based partitioning is allowed according to an embodiment of the present invention.

When a coding block is encoded by inter prediction, one of 8 partitioning modes may be applied to the coding block, as in an example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
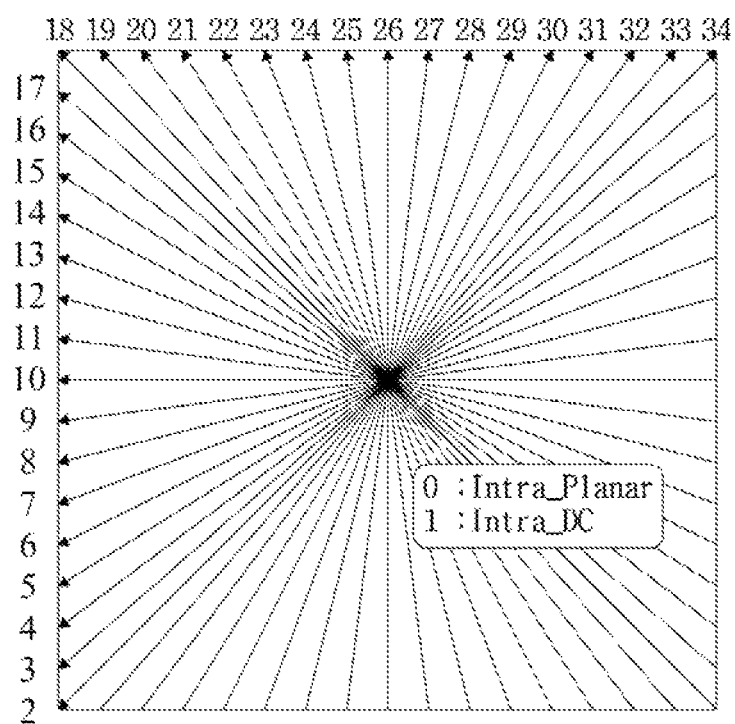
FIG. 8 is a diagram illustrating types of pre-defined intra prediction modes for a device for encoding/decoding a video according to an embodiment of the present invention.

FIG. 8 is a diagram illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

Specifically, a larger number of intra prediction modes than 35 intra prediction modes shown in FIG. 8 may be used. At this time, the use of a larger number of intra prediction modes than the 35 intra prediction modes may be referred to as an extended intra prediction mode.

Figure 9:
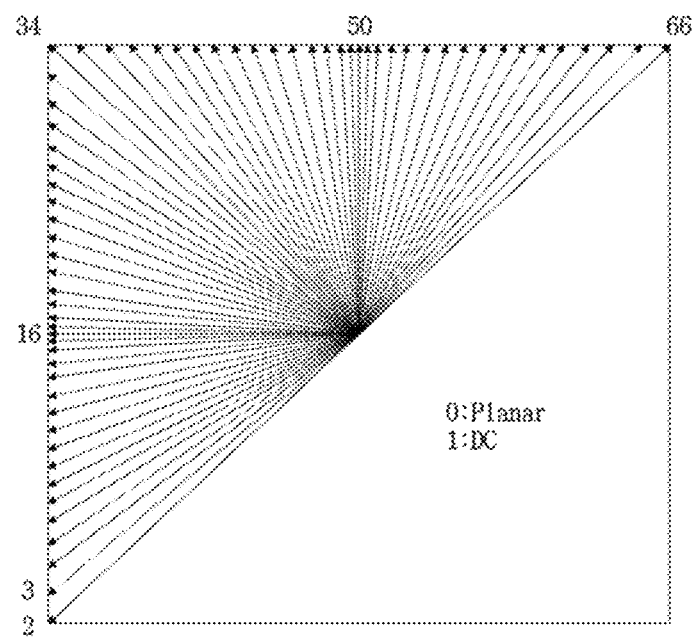
FIG. 9 is a diagram illustrating a kind of extended intra prediction modes according to an embodiment of the present invention.

FIG. 9 illustrates an example of extended intra prediction modes, and the extended intra prediction modes may include 2 non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on a size and/or shape of the block, a different number of intra prediction modes may be used to perform intra prediction. That is, depending on a size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra 2N×2N, and only 35 directional intra prediction modes may be allowed for Intra N×N.

A size of a block to which the extended intra prediction mode is applied may be set differently for each sequence, picture or slice. For example, it is set that the extended intra prediction mode is applied to a block (e.g., CU or PU) which has a size greater than 64×64 in the first slice. On the other hands, it is set that the extended intra prediction mode is applied to a block which has a size greater than 32×32 in the second slice. Information representing a size of a block to which the extended intra prediction mode is applied may be signaled through on the basis of a sequence, a picture, or a slice. For example, the information indicating a size of the block to which the extended intra prediction mode is applied may be defined as 'log 2_extended_intra_mode_size_minus4' obtained by taking a logarithm of the block size and then subtracting the integer 4. For example, if a value of log 2_extended_intra_mode_size_minus4 is 0, it may indicate that the extended intra prediction mode may be applied to a block having a size equal to or greater than 16×16. And if a value of log 2_extended_intra_mode_size_minus4 is 1, it may indicate that the extended intra prediction mode may be applied to a block having a size equal to or greater than 32×32.

As described above, the number of intra prediction modes may be determined in consideration of at least one of a color component, a chroma format, or a size or a shape of a block. In addition, the number of intra prediction mode candidates (e.g., the number of MPMs) used for determining an intra prediction mode of a current block to be encoded/decoded may also be determined according to at least one of a color component, a color format, or a size or a shape of a block. In addition, it is also possible to use a larger number of intra prediction modes than shown in FIG. 8. For example, by further subdividing the directional prediction modes shown in FIG. 8, it is also possible to use 129 directional prediction modes and 2 non-directional prediction modes. Whether to use a larger number of intra prediction modes than shown in FIG. 8 may be determined in consideration of at least one of the color component, the color format component, the size or the shape of the block, as in the above-described example.

Referring to the drawings to be described later, a method of determining an intra prediction mode of a current block to be encoded/decoded and a method of performing intra prediction using the determined intra prediction mode will be described with the drawings.

Figure 10:
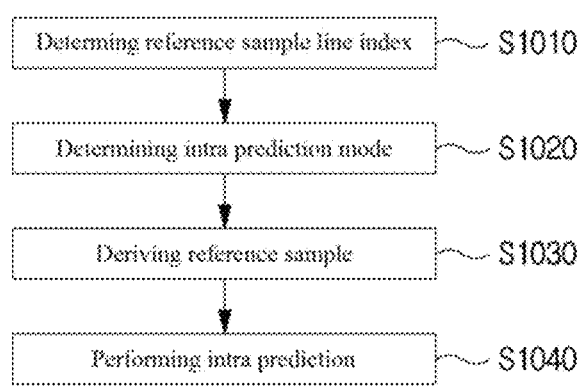
FIG. 10 is a flowchart briefly illustrating an intra prediction method according to an embodiment of the present invention.

FIG. 10 is a flowchart briefly illustrating an intra prediction method according to an embodiment of the present invention.

First, a reference sample line index of a current block may be determined S1010. The reference sample line index may be used to determine a reference sample line that is used to perform intra prediction of the current block. Among multiple reference sample lines, at least one reference sample line indicated by the reference sample line index may be used to perform intra prediction of the current block.

Figure 11:
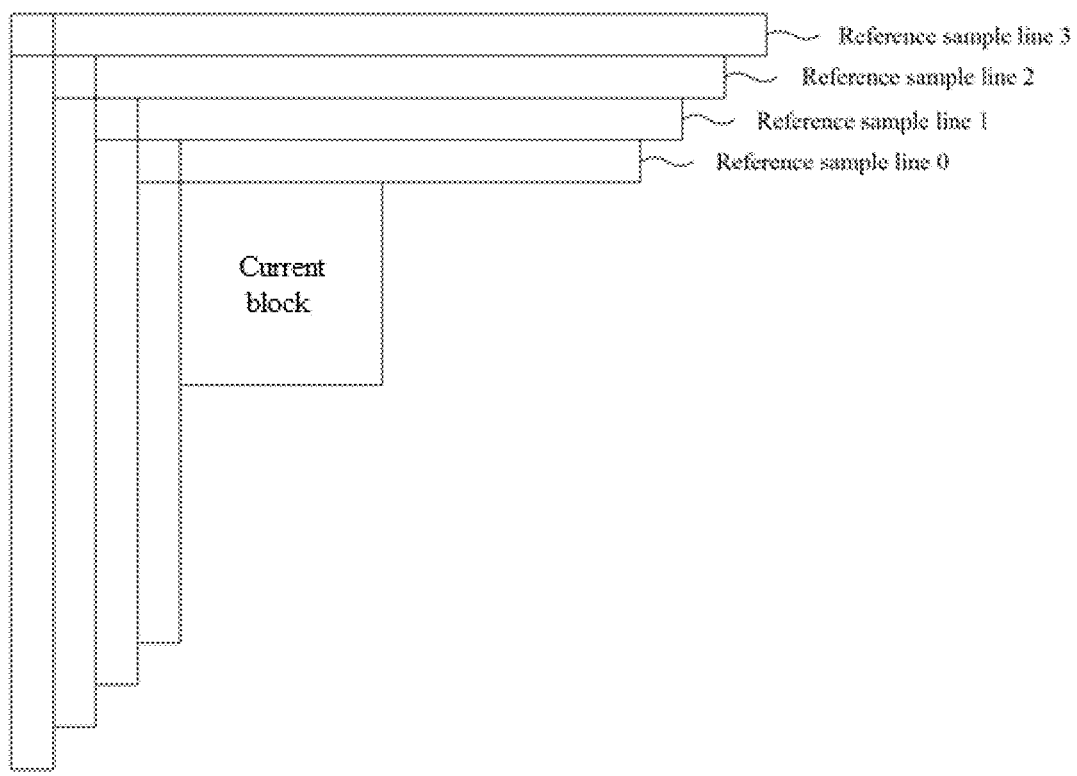
FIG. 11 is a diagram illustrating an example of multiple reference sample lines.

FIG. 11 is a diagram illustrating an example of multiple reference sample lines.

An N-th reference sample line may include: a top reference sample of which the y coordinate is smaller by N than that of the topmost row of the current block; and a left reference sample of which the x coordinate is smaller by N than that of the leftmost column of the current block. Herein, the N-th reference sample line represents a reference sample line of which an index is N−1, in the example shown in FIG. 11. The N-th reference sample line may include top reference samples starting from P(−N, −N) to P(2W+N−1, −N), and left reference samples starting from P(−N, −N) to P(−N, 2H+N−1). For example, the reference sample line 1 may include top reference samples starting from P(−2, −2) to P(2W+1, −2), and left reference samples starting from P(−2, −2) to P(−2, 2H+1).

The number of reference sample lines that may be used as reference sample line candidates may be two, three, four, or more. For example, in the example shown in FIG. 11, a reference sample line 0, a reference sample line 1, and a reference sample line 3 may be used as reference sample line candidates.

The number of the reference sample lines or the positions of the reference sample lines that may be used as reference sample line candidates may be determined based on at least one of the size, the shape, the intra prediction mode, and the position of the current block. For example, when the current block is positioned near a boundary of a CTU or a boundary of a tile, the number of reference sample line candidates is determined to be one (for example, a reference sample line 0). When the current block is not positioned near a boundary of a CTU or a boundary of a tile, the number of reference sample line candidates is determined to be three (for example, a reference sample line 0, a reference sample line 1, and a reference sample line 3). For example, when the intra prediction mode of the current block falls within a first range, the reference sample line 0, the reference sample line 1, and the reference sample line 3 are used as reference sample line candidates. When the intra prediction mode of the current block falls within a second range, the reference sample line 0, the reference sample line 2, and the reference sample line 2 are used as reference sample line candidates.

Information for selecting at least one of the multiple reference sample lines may be signaled through a bitstream. When the index information is not encoded, it is inferred that the reference sample line 0 adjacent to the current block is selected.

Alternatively, on the basis of the size, the shape, the position, or the intra prediction mode of the current block, at least one of the multiple reference sample lines may be selected. For example, when at least one among the width, the height, and the size of the current block is smaller than a predefined value, the reference sample line 0 is selected. For example, when the current block adjoins the top boundary of the CTU or tile, the reference sample line 0 is selected.

Alternatively, a reference sample line may be selected on the basis of whether the current block is partitioned into sub-blocks. For example, when the current block is partitioned into sub-blocks, the reference sample line 0 is selected.

Alternatively, when the current block is partitioned into multiple sub-blocks, a reference sample line is determined for each of the sub-blocks. Alternatively, it may be defined that all the sub-blocks have the same reference sample line index.

When the current block is partitioned into multiple sub-blocks, intra prediction is performed on a sub-block basis.

Multiple reference sample lines may be selected for the current block. Whether to perform intra prediction using multiple reference sample lines may be adaptively determined according to the size, the shape, or the intra prediction mode of the current block. For example, when the intra prediction mode of the current block is a non-directional prediction mode or a predefined directional intra prediction mode, multiple reference sample lines are not used. The predefined directional intra prediction mode may include at least one among a vertical-direction intra prediction mode, a horizontal-direction intra prediction mode, and a diagonal-direction intra prediction mode.

The multiple reference sample lines may include a reference sample line selected by index information, and a reference sample line derived by adding or subtracting a predefined value from the index of the reference sample line. Herein, the predefined value may be one or two.

Alternatively, multiple pieces of index information may be signaled through a bitstream. The multiple pieces of index information indicate different reference sample lines.

A prediction sample may be obtained on the basis of at least one among a weighted sum operation, an average operation, a minimum value operation, and a maximum value operation of multiple reference samples. Herein, the index of the reference sample line including at least one of the multiple reference samples may be different from the index of the reference sample line including the remaining reference samples.

Next, the intra prediction mode of the current block may be determined S1020.

In order to determine the intra prediction mode of the current block, most probable mode (MPM) candidates may be derived on the basis of an intra prediction mode of a neighboring block adjacent to the current block. Herein, the neighboring block may include at least one of blocks adjacent to the top, the bottom, the left side, the right side, and the corner of the current block. For example, the MPM candidates may be derived on the basis of the intra prediction mode of the top neighboring block and the intra prediction mode of the left neighboring block. The top neighboring block may include a top neighboring sample at a predefined position of which the y-coordinate value is smaller than that of the topmost row of the current block. The predefined position may be (0, −1), (W/2, −1), (W−1, −1), or (W, −1). The coordinates (0, 0) represent the position of the top left sample included in the current block and W represents the width of the current block. The left neighboring block may include a left neighboring sample at a predefined position of which the x-coordinate value is smaller than that of the leftmost column of the current block. The predefined position may be (−1, 0), (−1, H/2), (−1, H−1), or (−1, H). H represents the height of the current block. If the neighboring block is encoded using inter prediction, an MPM candidate may be included using an intra prediction mode of a collocated block of the neighboring block or the current block.

The number of most probable mode (MPM) candidates that a candidate list includes may be three, four, five, six, or more. The maximum number of MPM candidates may be a fixed value preset in an image encoder/decoder. Alternatively, the maximum number of MPM candidates may be determined on the basis of an attribute of the current block. The attribute may include at least one of the position/size/shape of the current block, the number/types of intra prediction modes that the current block may use, the color type (luma/chroma) of the current block, the chroma format of the current block, or information on whether the current block is partitioned into multiple sub-blocks. Alternatively, information indicating the maximum number of MPM candidates may be signaled through a bitstream. The information indicating the maximum number may be signaled at least one among a sequence level, a picture level, a slice level, and a bock level.

The intra prediction mode of the neighboring block, the directional intra prediction mode similar to that of the neighboring block, or a default mode may be set as the MPM candidate. The directional intra prediction mode similar to that of the neighboring block may be derived by adding or subtracting a predefined value from the intra prediction mode of the neighboring block. The predefined value may be an integer of one, two, or more. The predefined value may be adaptively determined according to the number of available intra prediction modes. For example, when the number of available intra prediction modes is 35, the predefined value is set to one. When the number of available intra prediction modes is 67, the predefined value is set to two. Further, when the number of available intra prediction modes is 131, the predefined value is set to four. When both of an intra prediction mode of a first neighboring block and an intra prediction mode of a second neighboring block are directional prediction modes, a directional intra prediction mode similar thereto is derived on the basis of the maximum value among the intra prediction mode of the first neighboring block and the intra prediction mode of the second neighboring block. The default mode may include at least one among a DC mode, a planar mode, a horizontal-direction prediction mode, a vertical-direction prediction mode, a top right diagonal-direction mode, a bottom left diagonal-direction mode, and a top left diagonal-direction mode.

MPM candidate indexes may be determined according to a predefined order. For example, when the intra prediction mode of the left neighboring block and the intra prediction mode of the top neighboring block are different from each other, the intra prediction mode of the left neighboring block has an index value smaller than that of the intra prediction mode of the top neighboring block.

Alternatively, MPM candidate indexes may be determined according to the size/shape of the current block. For example, when the current block is a non-square shape of which the height is greater than the width, the intra prediction mode of the top neighboring block has an index value smaller than that of the intra prediction mode of the left neighboring block. When the current block is a non-square shape of which the width is greater than the height, the intra prediction mode of the left neighboring block has an index value smaller than that of the intra prediction mode of the top neighboring block.

When extended intra prediction modes and predefined 35 intra prediction modes are selectively used, the intra prediction mode of the neighboring block is converted into an index corresponding to the extended intra prediction modes, or is converted into an index corresponding to the 35 intra prediction modes, thereby deriving MPM candidates. For the conversion of the index, a predefined table may be used, or a scaling operation based on a predetermined value may be used. Herein, the predefined table may define a mapping relationship between different intra prediction mode groups (for example, the extended intra prediction modes and the 35 intra prediction modes).

For example, when the left neighboring block uses 35 intra prediction modes and the intra prediction mode index of the left neighboring block is 10 (horizontal mode), the index is converted to an index 18 corresponding to a horizontal mode among the extended intra prediction modes.

Alternatively, when the top neighboring block uses the extended intra prediction modes and the intra prediction mode index of the top neighboring block is 50 (vertical mode), the index is converted to an index 26 corresponding to a vertical mode among the 35 intra prediction modes.

When the index of the reference sample line selected at step S1010 is equal to or greater than a predefined value, the candidate list is set not to include the DC mode and/or the planar mode. The predefined value may be an integer of one or more.

When the current block is partitioned into multiple sub-blocks, a current candidate list is set not to include the DC mode. In addition, the candidate list may include a default mode. Herein, the number or the types of default modes may vary depending on the partition type of the current block.

Information indicating whether the MPM candidate that is the same as the intra prediction mode of the current block is included in the candidate list may be signaled through a bitstream. When the information indicates that the MPM candidate the same as the intra prediction mode of the current block is present, index information specifying any one of the MPM candidates included in the candidate list is signaled through a bitstream. The MPM candidate specified by the index information may be set as an intra prediction mode of the current block. When encoding/signaling the information is omitted, it is determined that the MPM candidate the same as the intra prediction mode of the current block is included in the candidate list.

Conversely, when the information indicates that the MPM candidate the same as the intra prediction mode of the current block is not present, remaining-mode information is signaled through a bitstream. The remaining-mode information is used to specify any one of the remaining intra prediction modes excluding the MPM candidates included in the candidate list. By using the remaining-mode information, the intra prediction mode of the current block may be determined. When the information indicates that the MPM candidate the same as the intra prediction mode of the current block is not present, MPM candidates are rearranged in ascending order. Afterward, the mode value indicated by the remaining-mode information is sequentially compared with the rearranged MPM candidates, so that the intra prediction mode of the current block may be derived. For example, when the mode value indicated by the remaining-mode information is equal to or less than the rearranged MPM candidates, 1 is added to the mode value. When the MPM candidate that is equal to or less than the updated mode value is not present, the updated mode value is determine as the intra prediction mode of the current block.

When the index of the reference sample line selected at step S1010 is equal to or greater than a predefined value, encoding of the information is omitted. Accordingly, when the index of the reference sample line is equal to or greater than the predefined value, the intra prediction mode of the current block is set to the MPM candidate indicated by the index information.

As described above, when the index of the reference sample line is equal to or greater than the predefined value, the candidate list is set not to include the DC mode and/or the planar mode. Accordingly, when the reference sample line index is equal to or greater than the predefined value, the DC mode and/or the planar mode is unavailable for the current block.

When the current block is partitioned into multiple sub-blocks, the multiple sub-blocks share the intra prediction mode of the current block. Alternatively, the intra prediction mode may be determined for each of the sub-blocks. For example, the information and/or the remaining mode may be encoded/decoded for each of the sub-blocks. Alternatively, information indicating whether the intra prediction mode of the sub-block is the same as that of the previous encoded/decoded sub-block may be signaled through a bitstream. Alternatively, the intra prediction mode of the current sub-block may be derived by adding/subtracting offset from the intra prediction mode of the previously encoded/decoded sub-block.

When the current block is partitioned into multiple sub-blocks, the encoding of the information is omitted. Accordingly, when current blocks are partitioned into multiple sub-blocks, the intra prediction mode of the current block is set to the MPM candidate indicated by the index information.

The multiple sub-blocks may share the intra prediction mode of the current block.

An intra prediction mode of a luma component and of a chroma component may be determined independently of each other. Alternatively, the intra prediction mode of the chroma component may be determined dependently on the intra prediction mode of the luma component.

Specifically, the intra prediction mode of the chroma component may be determined on the basis of the intra prediction mode of the luma component as shown in Table 1 below.

TABLE 1

| Intra_chroma_pred_mode | IntraPredModeY[xCb] [yCb] | | | | |
|---|---|---|---|---|---|
| [xCb] [ycb] | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode denotes information signaled to specify the intra prediction mode of the chroma component, and IntraPredModeY denotes the intra prediction mode of the luma component.

Next, the reference samples for the current block may be derived S1030. For example, when the N-th reference sample line is selected at step S1010, the top reference samples starting from P(−N, −N) to P(2W+N−1, −N), and the left reference samples starting from P(−N, −N) to P(−N, 2H+N−1) are derived.

A reference sample may be derived from a reconstructed sample that is encoded/decoded before the current block. The reconstructed sample may refer to a sample in a state before an in-loop filter is applied or a state after the in-loop filter is applied.

A predetermined intra filter may be applied to reference samples. Filtering reference samples by using an intra filter may be referred to as reference sample smoothing. The intra filter may include at least one among a first intra filter applied in a horizontal direction, and a second intra filter applied in a vertical direction. Either the first intra filter or the second intra filter may be selectively applied according to the position of the reference sample. Alternatively, two intra filters may be applied to one reference sample. A filter coefficient of at least one among the first intra filter and the second intra filter may be (1,2,1), but no limitation thereto is imposed.

The filtering may be adaptively performed on the basis of at least one of the intra prediction mode of the current block, or the size of the transform block related to the current block. For example, when the intra prediction mode of the current block is the DC mode, the vertical mode, or the horizontal mode, filtering is not performed. When the size of the transform block is N×M, filtering is not performed. Herein, N and M may be the same or different values, and may be any one of values of 4, 8, 16, and more. For example, when the size of the transform block is 4×4, filtering is not performed. Alternatively, whether to perform filtering may be determined on the basis of a result of comparing the difference between the intra prediction mode of the current block and the vertical mode (or horizontal mode), with a predefined threshold. For example, filtering is performed only when the difference between the intra prediction mode of the current block and the vertical mode is greater than the threshold. The threshold may be defined for each size of the transform block, as shown in Table 2.

TABLE 2

|  | 8 × 8 transform | 16 × 16 transform | 32 × 32 transform |
| --- | --- | --- | --- |
| Threshold | 7 | 1 | 0 |

Any one of multiple intra filter candidates predefined in the image encoder/decoder may be determined as the intra filter. To this end, a particular index specifying an intra filter for the current block among multiple intra filter candidates may be signaled. Alternatively, the intra filter may be determined on the basis of at least one of the size/shape of the current block, the size/shape of the transform block, information on the filter strength, or a variation of neighboring samples.

Next, intra prediction may be performed using the intra prediction mode of the current block and the reference samples S1040.

A prediction sample may be obtained using the intra prediction mode of the current block and a reference sample. When multiple reference sample lines are selected, a prediction sample is obtained on the basis of a weighted sum operation or an average operation of the reference samples belonging to different reference sample lines. For example, a prediction sample may be derived on the basis of a weighted sum operation of a first reference sample belonging to a first reference sample line and a second reference sample belonging to a second reference sample line. Here, weights applied to the first reference sample and the second reference sample may have the same value. Alternatively, a weight applied to each reference sample may be determined on the basis of the distance between a prediction target sample and a reference sample. For example, among the first reference sample and the second reference sample, a weight applied to the reference sample closer to the prediction target sample may have a larger value than a weight applied to the other reference sample.

However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIG. 12. However, the correction process is not limited to being applied only to the intra prediction sample, and may be applied to an inter prediction sample or the reconstructed sample.

Figure 12:
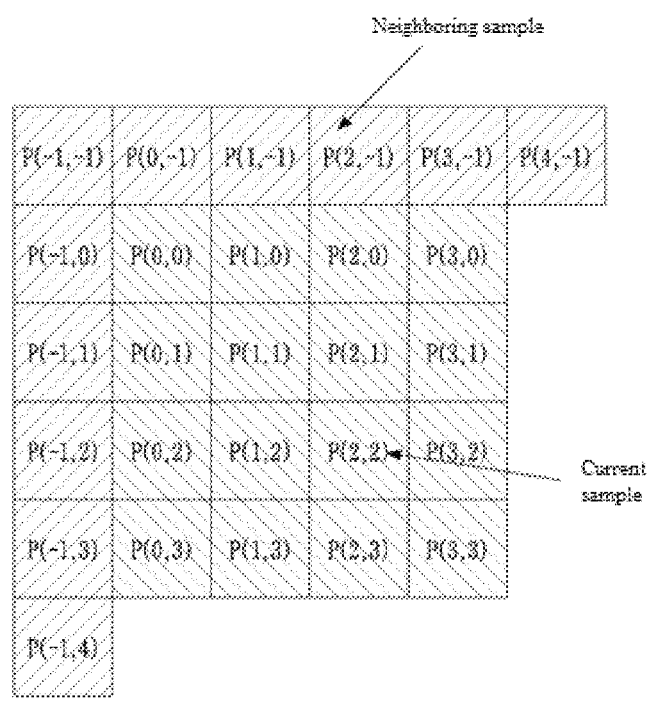
FIG. 12 is a diagram illustrating a method of correcting a prediction sample of a current block based on differential information of neighboring samples according to an embodiment of the present invention.

FIG. 12 is a diagram illustrating a method of correcting a prediction sample of a current block based on differential information of neighboring samples according to an embodiment of the present invention.

The prediction sample of the current block may be corrected based on the differential information of a plurality of neighboring samples for the current block. The correction may be performed on all prediction samples in the current block, or may be performed on prediction samples in predetermined partial regions. The partial regions may be one row/column or a plurality of rows/columns, and these may be preset regions for correction in the device for encoding/decoding a video. For example, correction may be performed on a one row/column located at a boundary of the current block or may be performed on a plurality of rows/columns from the boundary of the current block. Alternatively, the partial regions may be variably determined based on at least one of a size/shape of the current block or an intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, or the like.). Here, the predetermined constant value may be determined considering the position of the prediction sample which is the correction target, the position of a column or a row including the prediction sample which is the correction target, the position of the prediction sample within the column, the row, or the like.

For example, when the intra prediction mode of the current block is the vertical mode, differential samples between the top left neighboring sample p(−1, −1) and neighboring samples p (−1, y) adjacent to the left boundary of the current block may be used to obtain the final prediction sample as shown in Equation 1.

$$P'(0,y)=P(0,y)+((p(-1,y)-p(-1,-1))\gg 1 \text{ for } y=0 \ldots N-1 \quad \text{[Equation 1]}$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample as shown in Equation 1

$$P'(x,0)=p(x,0)+((p(x,-1)-p(-1,-1))\gg 1 \text{ for } x=0 \ldots N-1 \quad \text{[Equation 2]}$$

For example, when the intra prediction mode of the current block is the vertical mode, differential samples between the top left neighboring sample p(−1, −1) and neighboring samples p (−1, y) adjacent to the left boundary of the current block may be used to obtain the final prediction sample as shown in Equation 2. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0,y)=P(0,y)+((p(-1,y)-p(-1,-1))>>1 \text{ for } y=0 \ldots N-1 \quad \text{[Equation 3]}$$

$$P'(1,y)=P(1,y)+((p(-1,y)-p(-1,-1))>>2 \text{ for } y=0 \ldots N-1 \quad \text{[Equation 4]}$$

For example, when the intra prediction mode of the current block is the horizontal mode, differential samples between the top left neighboring sample p(−1, −1) and neighboring samples p(x, −1) adjacent to the left boundary of the current block may be used to obtain the final prediction sample. This is as described above in the horizontal mode. For example, the prediction samples may be corrected as in Equations 5 and 6 below.

$$P'(x,0)=p(x,0)+((p(x,-1)-p(-1,-1))>>1 \text{ for } x=0 \ldots N-1 \quad \text{[Equation 5]}$$

$$P'(x,1)=p(x,1)+((p(x,-1)-p(-1,-1))>>2 \text{ for } x=0 \ldots N-1 \quad \text{[Equation 6]}$$

When an intra prediction mode of a current block is a directional prediction mode, intra prediction of the current block may be performed based on the directionality of the directional prediction mode. For example, Table 3 shows an intra direction parameter intraPredAng from Mode 2 to Mode 34, which is the directional intra prediction mode illustrated in FIG. 8.

prediction of the current block, it is assumed that they are arranged in a line along the vertical or horizontal direction, and reference samples of each prediction target sample may be selected.

For example, in the case where the intra direction parameter is negative (e.g., the intra prediction mode corresponding to Mode 11 to Mode 25 in Table 3), the top reference samples and the left reference samples may be rearranged along the horizontal or vertical direction to form a one-dimensional reference sample group P_ref_1D.

Figure 13:
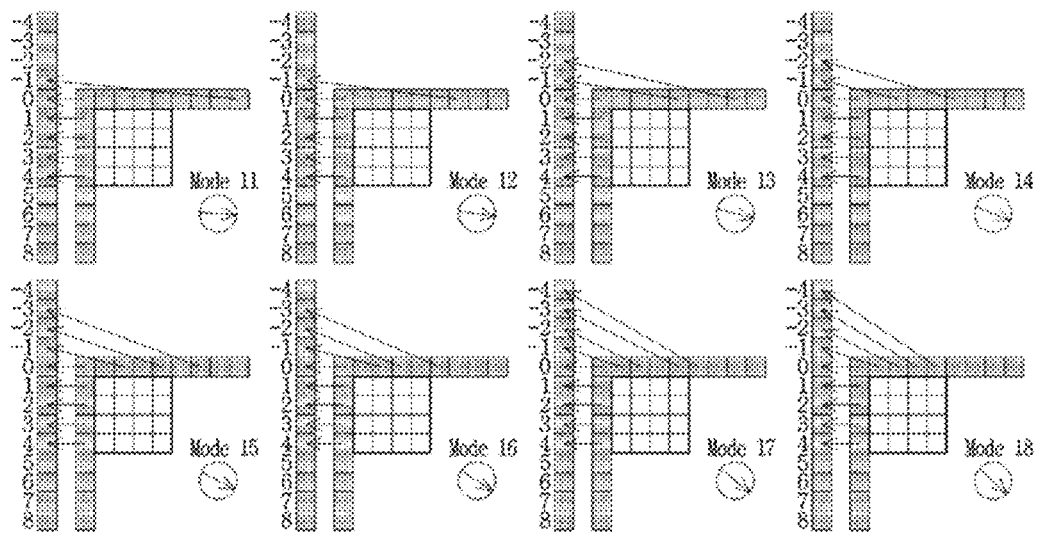
FIGS. 13 and 14 are diagrams illustrating a one-dimensional reference sample group in which reference samples are rearranged in a line.
Figure 14:
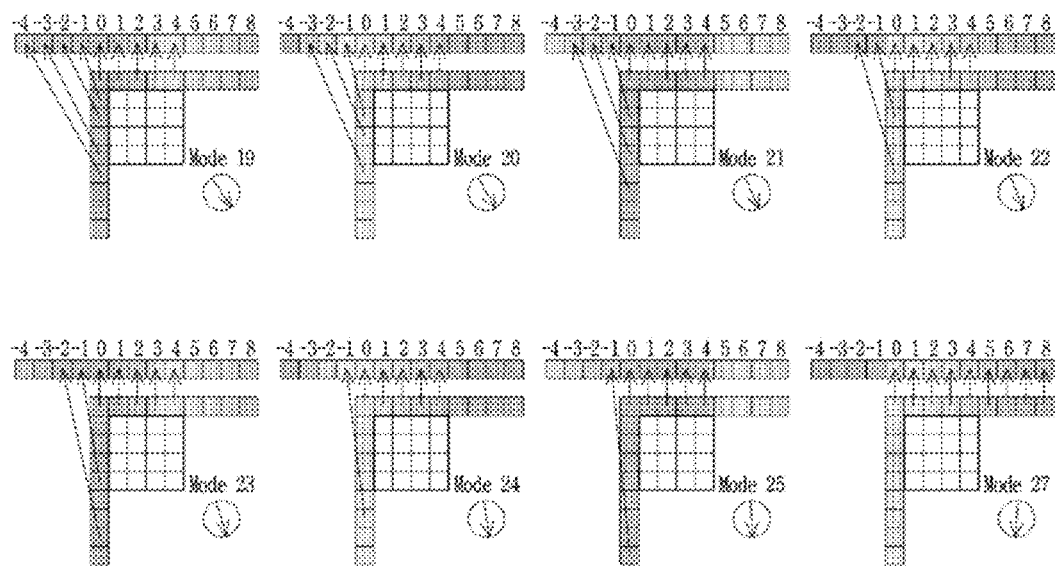

FIGS. 13 and 14 are a diagram illustrating a one-dimensional reference sample group in which reference samples are rearranged in a line.

Whether the reference samples are arranged in a vertical direction or in a horizontal direction may be determined according to the direction of the intra prediction mode. For example, when the intra prediction mode is directed to the left (for example, the index of the intra prediction mode is between 11 and 18 in the example shown in FIG. 8), as in the example shown in FIG. 13, a one-dimensional reference sample group in which the left reference samples and the top reference samples are arranged in a vertical direction is generated by rotating the top reference samples of the current block in a counterclockwise direction.

Conversely, when the intra prediction mode is directed to the top (for example, the index of the intra prediction mode is between 19 and 25 in the example shown in FIG. 8), as in the example shown in FIG. 14, a one-dimensional reference sample group in which the left reference samples and the top reference samples are arranged in a horizontal direction is generated by rotating the left reference samples of the current block in a clockwise direction.

If the intra direction parameter of the current block is not negative, intra prediction for the current block may be

TABLE 3

| predModeIntra | 1   | 2   | 3   | 4   | 5   | 6  | 7  | 8  | 9  | 10 | 11 | 12 | 13 | 14  | 15  | 16  |
|---------------|-----|-----|-----|-----|-----|----|----|----|----|----|----|----|----|-----|-----|-----|
| intraPredAng  | —   | 32  | 26  | 21  | 17  | 13 | 9  | 5  | 2  | 0  | −2 | −5 | −9 | −13 | −17 | −21 |
| predModeIntra | 18  | 19  | 20  | 21  | 22  | 23 | 24 | 25 | 26 | 27 | 28 | 29 | 30 | 31  | 32  | 33  |
| intraPredAng  | −32 | −26 | −21 | −17 | −13 | −9 | −5 | −2 | 0  | 2  | 5  | 9  | 13 | 17  | 21  | 26  |

In Table 3, 33 directional intra prediction modes have been described by way of example, but more or fewer directional intra prediction modes may be defined.

An intra direction parameter for a current block may be determined based on a lookup table that defines a mapping relationship between a directional intra prediction mode and an intra direction parameter. Alternatively, the intra direction parameter for the current block may be determined based on the information signaled through the bitstream.

Intra prediction of the current block may be performed using at least one of the left reference sample or the top reference sample, depending on the directionality of the directional intra prediction mode. Here, the top reference sample may be a reference sample (e.g., (−1, −1) to (2W−1, −1)) having a y-axis coordinate smaller than the prediction target sample (x, 0) included in the top row in the current block, and the left reference sample may be a reference sample (e.g., (−1, −1) to (−1, 2H−1)) having x-axis coordinates smaller than the prediction target sample (0, y) included in the leftmost column in the current block.

Depending on a directionality of an intra prediction mode, reference samples of the current block may be arranged in one dimension. Specifically, when both the top reference sample and the left reference sample should be used for intra performed using only the left reference samples or the top reference samples. Accordingly, for the intra prediction modes in which the intra direction parameter is not negative, the one-dimensional reference sample group may be constituted using only the left reference sample or the top reference samples.

Based on the intra direction parameter, a reference sample determination index iIdx for specifying at least one reference sample used to predict the prediction target sample may be derived. In addition, a weight related parameter ifact used to determine a weight applied to each reference sample based on the intra direction parameter may be derived. For example, Equations 7 and 8 illustrate examples of deriving reference sample determination index and weight related parameter $$iIdx=(y+1)*(P_{ang}/32)$$

$$ifact=[(y+1)*P_{ang}]31 \quad \text{[Equation 7]}$$

As shown in Equation 7, iIdx and ifact are variably determined according to the slope of the directional intra prediction mode. In this case, the reference sample specified by iIdx may correspond to an integer pel.

Based on a reference sample determination index, at least one reference sample may be specified for each prediction sample. For example, the position of the reference sample in the one-dimensional reference sample group for predicting the prediction target sample in the current block may be specified based on the reference sample determination index. Based on the reference sample at the specified position, a prediction image (i.e., a prediction sample) for the prediction target sample may be generated.

Depending on the intra prediction mode of the current block, a prediction image for a prediction target sample may be generated on the basis of one or multiple reference samples.

For example, when a virtual angular line extending from a prediction target sample passes an integer-pel position (that is, a reference sample at an integer position) within a one-dimensional reference sample group, the reference sample at the integer-pel position is copied, or the reference sample is scaled depending on the position between the reference sample at the integer-pel position and the prediction target sample, thereby generating a prediction image for the prediction target sample. The virtual angular line may refer to a uni-directional/bi-directional extended line at an angle of the intra prediction mode of the current block or at a slope of the intra prediction mode. For example, Equation 8 below represents an example in which a reference sample P_ref_1D(x+iIdx+1) specified by the intra prediction mode of the current block is copied to generate a prediction image P(x, y) for a prediction target sample at a position (x, y).

$$P(x,y)=P\_ref\_1D(x+iIdx+1) \quad \text{[Equation 8]}$$

Conversely, when the virtual angular line extending from the prediction target sample does not pass the integer-pel position, a prediction image for the prediction target sample is obtained using multiple reference samples. The prediction image for the prediction target sample may be generated by linearly interpolating a reference sample adjacent to the position where the virtual angular line passes, and at least one neighboring reference sample adjacent to the reference sample. Alternatively, the prediction image for the prediction target sample may be obtained by performing tap filter-based interpolation on the reference sample and the at least one neighboring reference sample. The number of taps of the interpolation filter may be a natural number of two or more. Specifically, according to the number of reference samples to be interpolated, the number of taps of the tap filter may be an integer of two, three, four, five, six, or more.

For example, when a virtual angular line extending from a prediction target sample passes between two integer-pel positions, a prediction image for the prediction target sample is generated using reference samples located both sides of the position where the virtual angular line passes or using at least one of reference samples at the two integer-pel positions and at least one of neighboring reference samples. Herein, the neighboring reference sample may include at least one of reference samples adjacent to the left/right or the top/bottom part of a reference sample. For example, Equation 9 below represents an example in which a prediction sample P(x, y) for a prediction target sample is generated by interpolating two or more reference samples.

$$P(x,y)=(32-i_{fact})/32*P\_ref\_1D(x+iIdx+1)+i_{fact}/32*P\_ref\_1D(x+iIdx+2) \quad \text{[Equation 9]}$$

A coefficient of an interpolation filter may be determined on the basis of a weight-related parameter ifact. For example, a coefficient of an interpolation filter may be determined on the basis of a distance between a fractional pel positioned on an angular line and an integer pel (that is, an integer position of each of reference samples).

Equation 10 below shows a case in which the number of taps of a tap filter is four.

$$P(x,y)=f(0)*P\_ref\_1D(x+iIdx-1)+f(1)*P\_ref\_1D(x+iIdx)+f(2)*P\_ref\_1D(x+iIdx+1)+f(3)*P\_ref\_1D(x+iIdx+2) \quad \text{[Equation 10]}$$

As in the example shown in Equation 10, a prediction image for a prediction target sample may be obtained by interpolating multiple consecutive reference samples. Herein, when at least one of N consecutive reference samples is not included in a one-dimensional reference sample group, the value of the reference sample is replaced with a predefined value or a value of a neighboring reference sample. For example, when a sample at a position (x+iIdx−1) is not included in a one-dimensional reference sample group, the value of the reference sample at the position is replaced with a predefined value or a value of a nearby reference sample (for example, P_ref_1D(x+iIdx)). Alternatively, when a sample at a position (x+iIdx+2) is not included in a one-dimensional reference sample group, a value of the reference sample at the position is replaced with a predefined value, a pre-calculated value, or a value of a nearby reference sample (for example, P_ref(x+iIdx+1)). Herein, the predefined value may be an integer including 0. The pre-calculated value may be a value determined by a bit depth. Alternatively, the predefined value may be calculated on the basis of an average value, a minimum value, or a maximum value of one or more reference samples.

A multi-tap filter may be a linear form. For example, a multi-tap filter of a linear form using multiple consecutive reference samples in a horizontal or vertical direction may be applied. Alternatively, a multi-tap filter may be a polygonal form such as a rectangular form, cross form, or the like. For example, a multi-tap filter of a cross form using a reference sample and reference samples adjacent to the reference sample in four directions may be used. The form of the multi-tap filter may be variably determined on the basis of the size, the shape, or the intra prediction mode of the current block.

As shown in Equations 8 to 10, generating a prediction sample by interpolating a reference sample with the use of the direction of intra prediction is referred to as an intra prediction sample interpolation technique.

In using the intra prediction sample interpolation technique, a large tap number of tap filters does not necessarily guarantee an improvement in prediction accuracy. For example, when a size of the current block is an asymmetric coding unit that one of the height or width is significantly larger than the other, such as 2×16, or a block of small size, such as 4×4, using a tap filter of 4 taps or more may result in excessive smoothing of the prediction image. Accordingly, a type of tap filter may be adaptively determined according to a size, shape, or intra prediction mode of the current block. Here, a type of tap filter may be defined by at least one of a number of taps, filter coefficients, filter strength (strong/weak), filtering direction or a filter type. The number of filter taps or the filter coefficient may be variably determined according to the filter strength. In addition, depending on the type of the tap filter, an application direction of the tap filter, such as horizontal interpolation, vertical interpolation, or horizontal and vertical interpolation, may be determined. The application direction of the tap filter may be variably set on the basis of lines (rows or columns) or samples in the current block.

Specifically, the type of tap filter to be used may be determined based on the width or height of a current block. As an example, when at least one of the width or height of the current block is smaller than a predefined value, an intra prediction sample interpolation technique may be performed by using a 2-tap filter instead of a 4-tap filter. On the other hand, when both the width and height of the current block is greater than or equal to the predetermined value, the intra prediction sample interpolation technique may be performed using the 4-tap filter. Here, the predefined value may represent a value such as 4, 8, or 16.

Alternatively, the type of tap filter to be used may be determined according to whether the width and height of the current block are the same. For example, when the width and height of the current block are different values, the intra prediction sample interpolation technique may be performed using the 2-tap filter instead of the 4-tap filter. On the other hand, when the width and height of the current block have the same value, the intra prediction sample interpolation technique may be performed using the 4-tap filter.

Alternatively, the type of tap filter to be used may be determined according to the ratio of the width and the height of the current block. For example, when the ratio of the width (w) to the height (h) of the current block (i.e., w/h or h/w) is less than a predefined threshold, the intra prediction sample interpolation technique may be performed using the 2-tap filter instead of the 4-tap filter On the other hand, when the ratio of the width and height of the current block is greater than or equal to the predefined threshold value, the intra prediction sample interpolation technique may be performed using the 4-tap filter.

Alternatively, the type of tap filter may be determined according to an intra prediction mode, a shape, or a size of the current block. For example, when the current block is a 2×16 type coding unit and the intra prediction mode of the current block is an intra prediction mode belonging to the horizontal range, the intra prediction sample interpolation technique may be performed using a tap filter having a tap number n. On the other hand, when the current block is a 2×16 type coding unit and the intra prediction mode of the current block is an intra prediction mode belonging to the vertical direction range, the intra prediction sample interpolation technique may be performed using a tap filter having a tap number m.

On the other hand, when the current block is a 16×2 type coding unit and the intra prediction mode of the current block is the intra prediction mode belonging to the horizontal direction range, the intra prediction sample interpolation technique may be performed using a tap filter having a tap number n. On the other hand, when the current block is a 16×2 type coding unit and the intra prediction mode of the current block is the intra prediction mode belonging to the vertical direction range, the intra prediction sample interpolation technique may be performed using a tap filter having a tap number m.

Here, the horizontal range may indicate a predetermined range including the intra prediction mode in the horizontal direction, and the vertical range may indicate a predetermined range including the intra prediction mode in the vertical direction. For example, based on 35 intra prediction modes, the horizontal direction range may indicate an intra prediction mode between modes 11 and 18, and the vertical direction range may indicate an intra prediction mode between modes 19 and 27.

In addition, n and m are constants greater than 0, and n and m may have different values. Alternatively, n and m may be set to have the same value, but at least one of filter coefficients or filter intensities of the n tap filter and the m tap filter may be set differently.

When using a directional prediction mode or a DC mode, there may be a problem in that image quality deterioration occurs at a block boundary. On the other hand, in a planar mode, the image quality deterioration of the block boundary is relatively smaller than those prediction modes.

Planar prediction may be performing weighted prediction of a first prediction image and a second prediction image after generating the first prediction image in a horizontal direction and a second prediction image in a vertical direction.

Herein, a first prediction image may be generated using reference samples positioned on the same horizontal line as a prediction target sample. Herein, the reference samples positioned on the same horizontal line as the prediction target sample may have the same y-axis coordinate as the prediction target sample. For example, the first prediction image may be generated on the basis of a weighted sum operation or an average operation of reference samples placed in the horizontal direction of the prediction target sample. Here, a weight applied to each of the reference samples may be determined depending on the distance to the prediction target sample, the size of the current block, or the like. The reference samples positioned on the same horizontal line as the prediction target sample may include a left reference sample (that is, the left reference sample having the y coordinate the same as that of the prediction target sample), and a right reference sample (that is, the right reference sample having the y coordinate the same as that of the prediction target sample). The right reference sample may be derived from the top reference sample. For example, the right reference sample may be derived by copying the value of the top reference sample that is positioned on the same vertical line as the right reference sample, or on the basis of a weighted sum operation or an average operation of multiple top reference samples. Here, the top reference sample positioned on the same vertical line as the right reference sample may have the x-axis coordinate that is the same as that of the right reference sample. For example, the right reference sample adjacent to the right side of the current block may be derived on the basis of the reference sample adjacent to the top right corner of the current block. Alternatively, the position of the top reference sample used to derive the right reference sample may be variably determined according to the shape, the size of the current block, or the position of the prediction target sample.

A second prediction image may be generated using reference samples positioned on the same vertical line as a prediction target sample. Here, the reference samples positioned on the same vertical line as the prediction target sample may have the same x-axis coordinate as the prediction target sample. For example, the second prediction image may be generated on the basis of a weighted sum operation or an average operation of reference samples placed in the vertical direction of the prediction target sample. Here, a weight applied to each of the reference samples may be determined depending on the distance to the prediction target sample, the size of the current block, or the like. The reference samples positioned on the same vertical line as the prediction target sample may include a top reference sample (that is, the top reference sample having the x coordinate the same as that of the prediction target sample), and a bottom reference sample (that is, the bottom reference sample having the x coordinate the same as that of the prediction target sample). The bottom reference sample may be derived from the left reference sample. For example, the bottom reference sample may be derived by copying the value of the left reference sample that is positioned on the same horizontal line as the bottom reference sample, or on the basis of a weighted sum operation or an average operation of multiple left reference samples. Herein, the left reference sample positioned on the same horizontal line as the bottom reference sample may have the y-axis coordinate that is the same as that of the bottom reference sample. For example, the bottom reference sample adjacent to the bottom of the current block may be derived on the basis of the reference sample adjacent to the bottom left corner of the current block. Alternatively, the position of the top reference sample used to derive the bottom reference sample may be variably determined according to the size, the shape of the current block, or the position of the prediction target sample.

Alternatively, the right reference sample may be derived using both the left reference sample and the top reference sample, or the bottom reference sample may be derived using both the left reference sample and the top reference sample.

For example, the right reference sample may be derived on the basis of a weighted sum operation, a minimum value operation, a maximum value operation, or an average operation between the left reference sample positioned on the same horizontal line as the right reference sample and the top reference sample positioned on the same vertical line as the right reference sample. The bottom reference sample may be derived on the basis of a weighted sum operation, a minimum value operation, a maximum value operation, or an average operation between the left reference sample positioned on the same horizontal line as the bottom reference sample and the top reference sample positioned on the same vertical line as the bottom reference sample.

Alternatively, after the bottom right reference sample may be derived using the left reference sample and the top reference sample, the derived right reference sample may be used to derive the right reference sample and the bottom reference sample. The bottom right reference sample may be derived on the basis of a weighted sum operation or an average operation between the left reference sample positioned on the same horizontal line as the bottom right reference sample and the top reference sample positioned on the same vertical line as the bottom right reference sample. For example, a bottom right reference sample P(W, H) (herein, W denotes the width of the current block, and H denotes the height of the current block) adjacent to the bottom right corner of the current block may be derived on the basis of a weighted sum operation or an average operation between a top right reference sample P(W, −1) and a bottom left reference sample P(−1, H). To derive the bottom right reference sample, the weights applied to the top right reference sample and the bottom left reference sample, respectively, may have the same value, or may have different values according to the width/height of the current block. For example, when the width of the current block is greater than the height, the weight applied to the top right reference sample has a greater value than the weight applied to the bottom left reference sample has. Conversely, when the height of the current block is greater than the width, the weight applied to the bottom left reference sample has a greater value than the weight applied to the top right reference sample.

Afterward, the right reference sample may be derived by interpolating the bottom right reference sample and the top right reference sample. In addition, the bottom reference sample may be derived by interpolating the bottom right reference sample and the bottom left reference sample. Here, a coefficient of an interpolation filter may be determined on the basis of at least one of the size of the current block, the shape of the current block, the distance from the right reference sample to the bottom right reference sample, the distance from the right reference sample to the top right reference sample, the distance from the bottom reference sample to the bottom right reference sample, or the distance from the bottom reference sample to the bottom left reference sample.

The right reference sample or the bottom reference sample may be derived using a reference sample at a fixed position or a reference sample at a position that is determined dependently on the prediction target sample. For example, the right reference sample may be derived using at least one among a top reference sample (for example, a top right reference sample) at a fixed position and a left reference sample (for example, a bottom left reference sample) at a fixed position regardless of the position of the prediction target sample. Alternatively, the right reference sample may be derived using at least one among a left reference sample (for example, a left reference sample having the same y-axis coordinate as the prediction target sample) and a top reference sample (for example, a top reference sample having the same x-axis coordinate as the prediction target sample) that are selected according to the prediction target sample. The bottom reference sample may be derived using at least one among a left reference sample (for example, a bottom left reference sample) at a fixed position and a top reference sample (for example, a top right reference sample) at a fixed position regardless of the position of the prediction target sample. Alternatively, the bottom reference sample may be derived using at least one among a left reference sample (for example, a reference sample having the same y-axis coordinate as the prediction target sample) and a top reference sample (for example, a reference sample having the same x-axis coordinate as the prediction target sample) that are selected according to the prediction target sample.

Figure 15A:
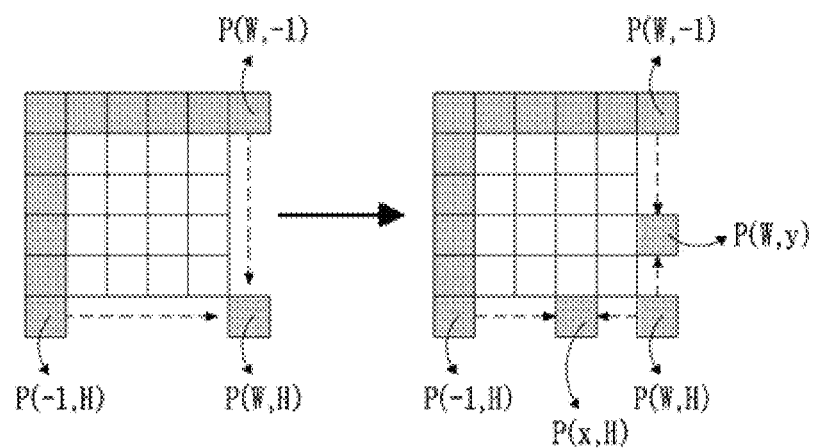
FIGS. 15A and 15B are diagrams illustrating an example of deriving a right reference sample or a bottom reference sample using a plurality of reference samples.
Figure 15B:
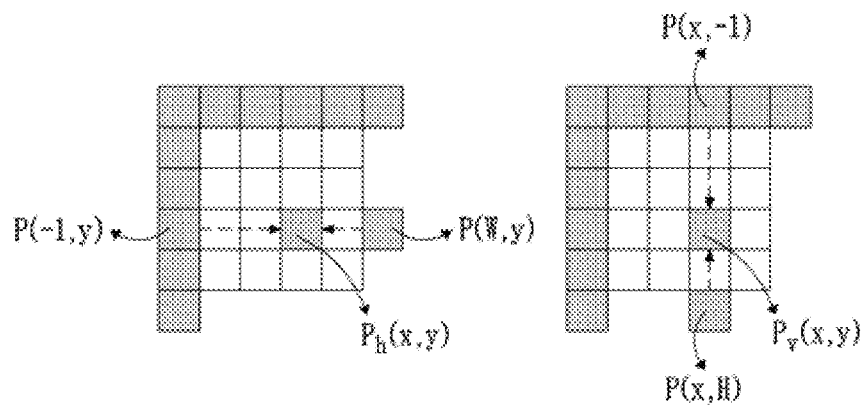

FIGS. 15A and 15B are diagrams illustrating an example of deriving a right reference sample or a bottom reference sample using multiple reference samples. It is assumed that the current block is a block in a W×H size.

Referring to FIG. 15A, first, a bottom right reference sample P(W, H) may be generated on the basis of a weighted sum operation or an average operation of a top right reference sample P(W, −1) and a bottom left reference sample P(−1, H) of the current block. Herein, weights applied to the top right reference sample and the bottom left reference sample, respectively, may have the same values. Alternatively, weights applied to the top right reference sample and the bottom left reference sample, respectively, may be determined on the basis of the width (W) and the height (H) of the current block. For example, the weight applied to the top right reference sample may be determined to be W/(W+H), and the weight applied to the bottom left reference sample may be determined to be H/(W+H). Accordingly, when the current block is in a square shape, a bottom right reference sample is derived by applying the same weights to the top right reference sample and the bottom left reference sample, respectively. Conversely, when the current block is in a non-square shape, a bottom right reference sample is derived by applying different weights to the top right reference sample and the bottom left reference sample, respectively.

A right reference sample P(W, y) for the prediction target sample (x, y) may be generated on the basis of the bottom right reference sample P(W, H) and the top right reference sample P(W, −1). For example, the right prediction sample P(W, y) may be acquired on the basis of a weighted sum operation or an average operation of the bottom right reference sample P(W, H) and the top right reference sample P(W, −1). In addition, a bottom reference sample P(x, H) for the prediction target sample (x, y) may be generated on the basis of the bottom right reference sample P(W, H) and the bottom left reference sample P(−1, H). For example, the bottom reference sample P(x, H) may be acquired on the basis of a weighted sum operation or an average operation of the bottom right reference sample P(W, H) and the bottom left reference sample P(−1, H).

As shown in FIG. 15B, a first prediction sample $P_h(x, y)$ and a second prediction sample $P_v(x, y)$ for a prediction target sample may be generated using a right reference sample and a bottom reference sample. Herein, the first prediction sample $P_h(x, y)$ may be generating on the basis of a weighted sum operation of the left reference sample P(−1, y) and the right reference sample P(W, y). The second prediction sample $P_v(x, y)$ may be generated on the basis of a weighted sum operation of the top reference sample P(x, −1) and the bottom reference sample P(x, H).

Figure 16:
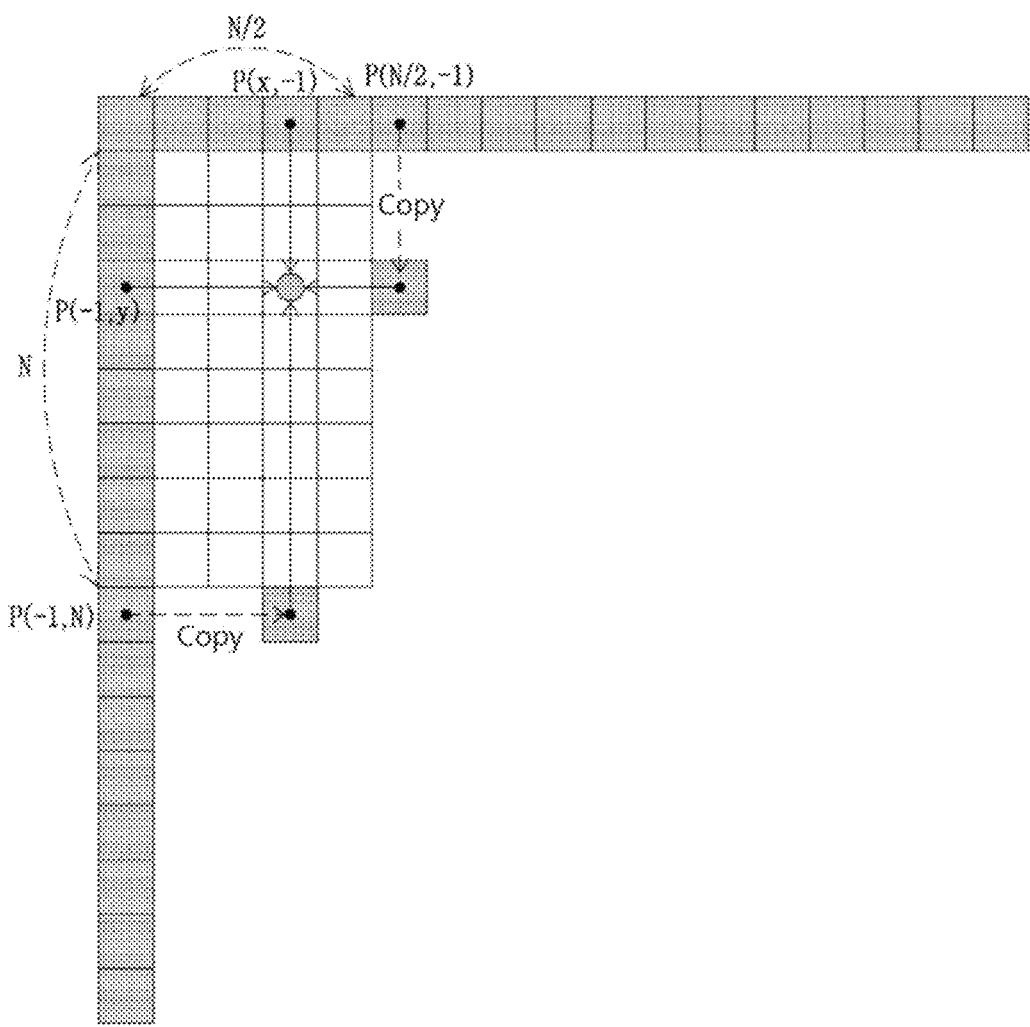
FIGS. 16 and 17 are diagrams illustrating an example of deriving a right reference sample and a bottom reference sample for a non-square block according to an embodiment of the present invention.
Figure 17:
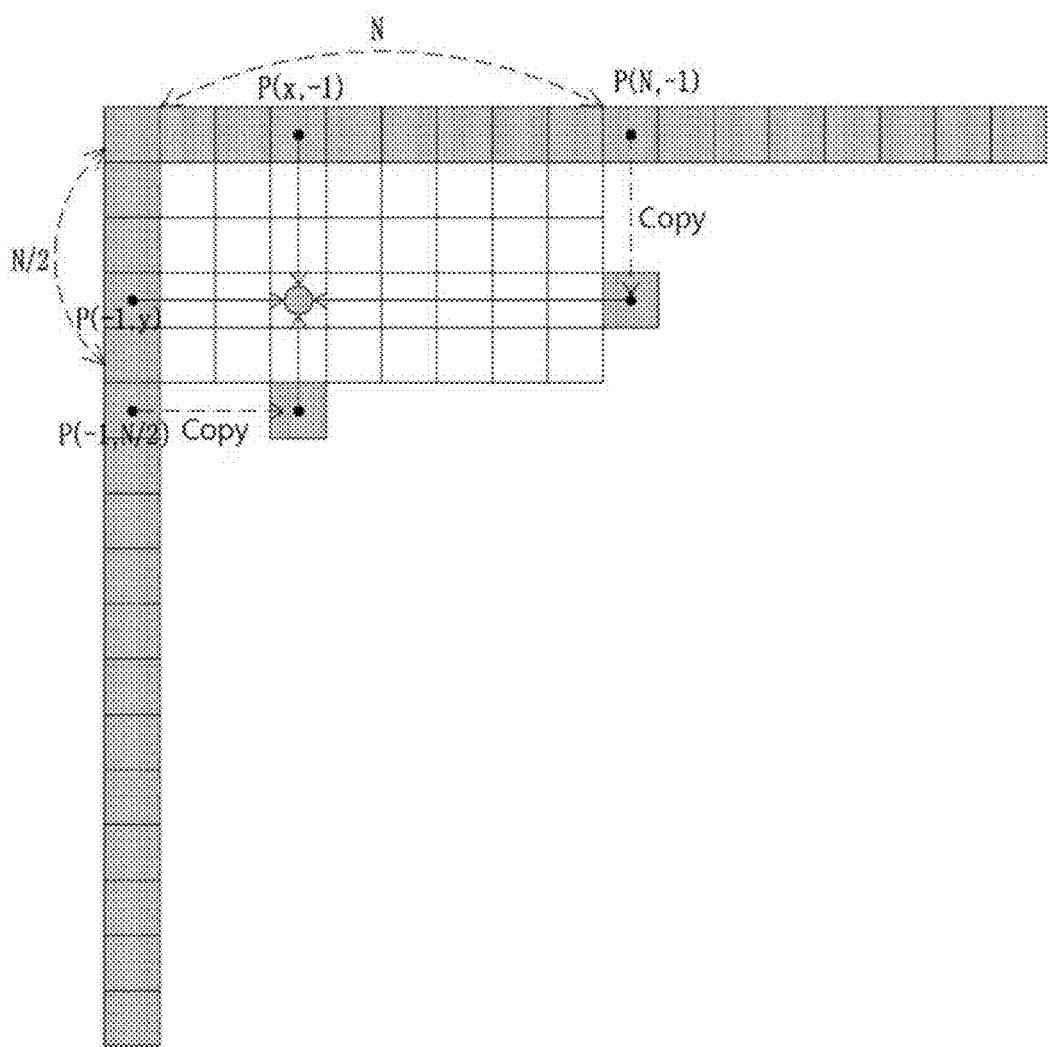

FIGS. 16 and 17 are diagrams illustrating an example of deriving a right reference sample and a bottom reference sample for a non-square block according to an embodiment of the present invention.

As in the example shown in FIG. 16, when the current block is a non-square block in a (N/2)×N size, a right reference sample is derived on the basis of a top reference sample (for example, a top right reference sample P(N/2, −1)) placed on the same vertical line as the right reference sample, and a bottom reference sample is derived on the basis of a left reference sample (for example, a bottom left reference sample P(−1, N)) placed on the same horizontal line as the bottom reference sample.

Alternatively, a right reference sample or a bottom reference sample may be derived on the basis of at least one among a weighted sum operation, an average operation, a minimum value operation, and a maximum value operation of the top right reference sample P(N/2, −1) and the bottom left reference sample P(−1, N). For example, a right reference sample may be derived on the basis of a weighted sum operation or an average operation of the top right reference sample P(N/2, −1) and the bottom left reference sample P(−1, N). Alternatively, a bottom right reference sample P(N/2, N) may be derived on the basis of a weighted sum operation or an average operation of the top right reference sample P(N/2, −1) and the bottom left reference sample P(−1, N), and a right reference sample may be derived by interpolating the bottom right reference sample P(N/2, N) and the top right reference sample P(N/2, −1).

A bottom reference sample may be derived on the basis of a weighted sum operation or an average operation of the top right reference sample P(N/2, −1) and the bottom left reference sample P(−1, N). Alternatively, a bottom right reference sample P(N/2, N) may be derived on the basis of a weighted sum operation or an average operation of the top right reference sample P(N/2, −1) and the bottom left reference sample P(−1, N), and a bottom reference sample may be derived by interpolating the bottom right reference sample P(N/2, N) and the bottom left reference sample P(−1, N).

As in the example shown in FIG. 17, when the current block is a non-square block in an N×(N/2) size, a right reference sample is derived on the basis of a top reference sample (for example, a top right reference sample P(N, −1)) placed on the same vertical line as the right reference sample, and a bottom reference sample is derived on the basis of a left reference sample (for example, a bottom left reference sample P(−1, N/2)) placed on the same horizontal line as the bottom reference sample.

Alternatively, a right reference sample or a bottom reference sample may be derived on the basis of at least one among a weighted sum operation, an average operation, a minimum value operation, and a maximum value operation of the top left reference sample P(N, −1) and the bottom left reference sample P(−1, N/2). For example, a right reference sample may be derived on the basis of a weighted sum operation or an average operation of the top right reference sample P(N, −1) and the bottom left reference sample P(−1, N/2). Alternatively, a bottom right reference sample P(N, N/2) may be derived on the basis of a weighted sum operation or an average operation of the top right reference sample P(N, −1) and the bottom left reference sample P(−1, N/2), and a right reference sample may be derived by interpolating the bottom right reference sample P(N, N/2) and the top right reference sample P(N, −1).

A bottom reference sample may be derived on the basis of a weighted sum operation or an average operation of the top right reference sample P(N, −1) and the bottom left reference sample P(−1, N/2). Alternatively, a bottom right reference sample P(N, N/2) may be derived on the basis of the top right reference sample P(N, −1) and the bottom left reference sample P(−1, N/2), and a bottom reference sample may be derived by interpolating the bottom right reference sample P(N, −1) and the bottom left reference sample P(−1, N/2).

As described above with reference to FIGS. 15 to 17, the bottom reference sample and the right reference sample may be derived on the basis of at least one among the left reference sample placed on the same horizontal line as the bottom reference sample, and the top reference sample of the current block placed on the same vertical line as the right reference sample. Differently from the above description, the right reference sample or the bottom reference sample may be derived using at least one among a top middle reference sample and a left middle reference sample.

For example, a bottom middle reference sample may be derived using a top middle reference sample. A bottom reference sample between a bottom middle reference sample and a bottom left reference sample may be derived through interpolation of the bottom middle reference sample and the bottom left reference sample. A bottom reference sample between a bottom middle reference sample and a bottom right reference sample may be derived through interpolation between the bottom middle reference sample and the bottom right reference sample. Alternatively, a bottom reference sample between a bottom middle reference sample and a bottom right reference sample may be derived through extrapolation between a bottom left reference sample and a bottom middle reference sample.

For example, a right middle reference sample may be derived using a left middle reference sample. A right reference sample between a right middle reference sample and a top left reference sample may be derived through interpolation of a right middle reference sample and a top right reference sample. A right reference sample between a right middle reference sample and a bottom right reference sample may be derived through interpolation between a right middle reference sample and a bottom right reference sample. Alternatively, a right reference sample between a right middle reference sample and a bottom right reference sample may be derived through extrapolation between a top right reference sample and a right middle reference sample.

Whether to derive a right reference sample or a bottom reference sample by using a right middle reference sample or a bottom middle reference sample may be determined on the basis of at least one among the size and the shape of the current block. For example, when the width of the current block is greater than a predefined value or when the current block is a non-square block of which the width is greater than the height, a bottom reference sample is derived using a bottom middle reference sample. When the height of the current block is greater than a predefined value or when the current block is a non-square block of which the height is greater than the width, a right reference sample is derived using a right middle reference sample.

For example, when the current block is a square block in an N×N size, a right reference sample is derived on the basis of a top right reference sample P(N, −1) and a bottom reference sample is derived on the basis of a bottom left reference sample P(−1, N). Alternatively, when the current block is a square block in an N×N size, a bottom right reference sample is derived on the basis of at least one among a weighted sum operation, an average operation, a minimum value operation, and a maximum value operation of a top right reference sample P(N, −1) and a bottom left reference sample P(−1, N), and a right reference sample and a bottom reference sample are derived using the bottom right reference sample.

Conversely, when the current block is a non-square block in an N×2/N size, a bottom middle reference sample P(N/2, N/2) is derived on the basis of a top middle reference sample P(N/2, −1) and a bottom left reference sample P(−1, N/2). A bottom reference sample may be derived on the basis of interpolation/extrapolation between a bottom middle reference sample and a bottom left reference sample, or interpolation/extrapolation between a bottom middle reference sample and a bottom right reference sample. Alternatively, when the current block is a non-square block in an N/2×N size, a right middle reference sample P(N/2, N/2) is derived on the basis of a top right reference sample P(N/2, −1) and a left middle reference sample P(−1, N/2). A right reference sample may be derived on the basis of interpolation/extrapolation between a right middle reference sample and a top right reference sample, or interpolation/extrapolation between a right middle reference sample and a bottom right reference sample.

A first prediction image may be acquired on the basis of weighted prediction of reference samples placed on the same horizontal line as a prediction target sample. In addition, a second prediction image may be acquired on the basis of weighted prediction of reference samples placed on the same vertical line as a prediction target sample.

Alternatively, a first prediction image or a second prediction image may be generated on the basis of at least one among an average operation, a minimum value operation, and a maximum value operation between reference samples.

A method of deriving a reference sample, or a method of acquiring a first/second prediction image may be predefined in the encoder/decoder. Alternatively, a method of deriving a reference sample, or a method of acquiring a first/second prediction image may be set differently depending on whether a prediction target sample is included in a predetermined region within the current block, the size, the shape of the current block, or the like. For example, depending on the position of the prediction target sample, the number of reference samples or the positions of the reference samples used to utilize the right or bottom reference sample may be determined differently. Alternatively, depending on the position of the prediction target sample, the number of reference samples or the weight applied to each of the reference samples used to derive the first prediction image or the second prediction image may be set differently.

For example, a first prediction image for prediction target samples included in a predetermined region may be acquired using a right reference sample that is derived using only a top reference sample (for example, a top right reference sample). Conversely, a first prediction image for prediction target samples included outside the predetermined region may be acquired using a right reference sample that is derived on the basis of a weighted sum operation or an average operation of a top reference sample and a left reference sample.

A second prediction image for prediction target samples included in a predetermined region may be acquired using a right reference sample that is derived using only a left reference sample (for example, a bottom left reference sample). Conversely, a second prediction image for prediction target samples included outside the predetermined region may be acquired using a right reference sample that is derived by interpolating a bottom right reference sample and a top reference sample. Herein, the bottom right reference sample may be derived on the basis of a weighted sum operation or an average operation of a top reference sample (for example, a top right reference sample) and a left reference sample (for example, a bottom left reference sample).

For example, in the example shown in FIG. 16, when the current block is a non-square block of which the height is longer than the width, a first prediction image of a prediction target sample at a position (x, y) included in a predetermined region within the current block is acquired on the basis of a right reference sample derived from P(N/2, −1). The right reference sample may be generated by copying a value of a reference sample P(N/2, −1). Conversely, a first current block prediction image of a prediction target sample at a position (x', y') included outside the predetermined region may be acquired on the basis of a right reference sample that is derived on the basis of a weighted sum operation or an average operation of P(N/2, −1) and P(−1, N). The right reference sample may be acquired by interpolating a bottom right reference sample P(N/2, N) and a top right reference sample P(N/2, −1) that are derived on the basis of P(N/2, −1) and P(−1, N).

Alternatively, as in the example shown in FIG. 17, when the current block is a non-square block of which the width is longer than the height, a second prediction image of a prediction target sample at a position (x, y) included in a predetermined region within the current block is acquired on the basis of a bottom reference sample derived from P(−1, N/2). The bottom reference sample may be generated by copying a value of a reference sample P(−1, N/2). Conversely, a second prediction image of a prediction target sample at a position (x', y') included outside the predetermined region within the current block may be acquired on the basis of a bottom reference sample that is derived on the basis of a weighted sum operation or an average operation of P(N, −1) and P(−1, N/2). The bottom reference sample may be acquired by interpolating a bottom right reference sample P(N, N/2) and a bottom left reference sample P(−1, N/2) that are derived on the basis of P(N, −1) and P(−1, N/2).

A first prediction image and/or a second prediction image of the prediction target samples included in a predetermined region may be generated on the basis of a weighted sum operation of reference samples. A first prediction image and/or a second prediction image of the prediction target samples outside the predetermined region may be generated on the basis of an average operation, a minimum value operation, or a maximum value operation of reference samples. Alternatively, a first prediction image and/or a second prediction image of the prediction target samples outside the predetermined region may be acquired using only any one of reference samples at a predefined position. For example, in the example shown in FIG. 16, when the current block is a non-square block of which the height is longer than the width, a first prediction image of a prediction target sample at a position (x, y) included in a predetermined region within the current block is acquired on the basis of a weighted sum operation or an average operation of a right reference sample P(N/2, y) derived from P(N/2, −1) and a left reference sample at a position P(−1, y). Conversely, a first prediction image of a prediction target sample at a position (x', y') not included in the predetermined region may be acquired on the basis of a right reference sample P(N/2, y') derived from P(N/2, −1) or of a left reference sample at a position P(−1, y').

Alternatively, in the example shown in FIG. 17, when the current block is a non-square block of which the width is longer than the height, a second prediction image of a prediction target sample at a position (x, y) included in a predetermined region within the current block is acquired on the basis of a weighted sum operation or an average operation of a bottom reference sample P(x, N/2) derived from P(−1, N/2) and a top reference sample at a position P(x, −1). Conversely, a prediction target sample at a position (x', y') not included in the predetermined region may be acquired on the basis of a bottom reference sample P(x', N/2) derived from P(−1, N/2) or of a top reference sample at a position P(−1, y').

The predetermined region may be one or more lines (for example, rows or columns) adjacent to the boundary of the current block, or a remaining region excluding the one or more lines. The boundary of the current block, which is a criterion for defining a predetermined region, may be at least one among a left boundary, a right boundary, a top boundary, and a bottom boundary. In addition, the number or positions of the boundaries used to define the predetermined region may be set differently depending on the shape of the current block. For example, when the current block is in a non-square shape of which the width is greater than the height, a predetermined region is defined on the basis of a left boundary or a right boundary. Conversely, when the current block is in a non-square shape of which the height is greater than the width, a predetermined region is defined on the basis of a top boundary or a right boundary.

Alternatively, a block in contact with one corner of the current block may be defined as a predetermined region. Herein, the size and the shape of the predetermined region may be determined on the basis of at least one among the size and the shape of the current block.

Under a planar mode, a final prediction image may be derived on the basis of a weighted sum operation, an average operation, a minimum value operation, or a maximum value operation of a first prediction image and a second prediction image.

For example, Equation 11 below represents an example in which a final prediction image P is generated on the basis of a weighted sum of a first prediction image $P_h$ and a second prediction image $P_v$.

$$P(x,y)=(w*P_h(x,y)+(1-w)*P_v(x,y)+N)>>(\log 2(N)+1) \quad \text{[Equation 11]}$$

In Equation 11 above, a prediction weight w may vary depending on the shape, the size of the current block, the position of the prediction target sample, or the like. Specifically, the prediction weight w may be determined on the basis of at least one among the width of the current block, the height of the current block, and a ratio between the width and the height. For example, when the current block is a square block, a prediction weight w is set so that the same weight is applied to a first prediction image and a second prediction image. That is, when the current block is in a square shape, a prediction weight w has a value of ½.

Conversely, when the current block is a non-square block of which the width is greater than the height, a prediction weight w is set so that a greater weight is applied to a first prediction image than to a second prediction image. For example, when the current block is a non-square block (for example, N×(N/2)) of which the width is greater than the height, a prediction weight w is set to ¾. Accordingly, the weight of ¾ may be applied to the first prediction image $P_h$, and the weight of ¼ may be applied to the second prediction image $P_v$. When the current block is a non-square block of which the height is greater than the width, a prediction weight w is set so that a greater weight is applied to a first prediction image than to a second prediction image. For example, when the current block is a non-square block (for example, (N/2)×N) of which the height is greater than the width, a prediction weight w is set to ¼. Accordingly, the weight of ¼ may be applied to the first prediction image $P_h$, and the weight of ¾ may be applied to the second prediction image $P_v$.

In FIG. 11, it is described that a reference sample line is constructed using top reference samples of which the y-coordinate values are smaller than those of the topmost row of the current block, and using left reference samples of which the x-coordinate values are smaller than those of the leftmost column of the current block.

According to an embodiment of the present invention, at least one of multiple reference sample line may be set to include a pre-reconstructed sample within the current block or a prediction sample within the current block. For example, a first reference sample line may include left reference samples and/or top reference samples. A second reference sample line may include a pre-reconstructed or predicted sample within the current block.

Alternatively, at least one of multiple reference sample lines may be set to include right reference samples and/or bottom reference samples. For example, a first reference sample line may include left reference samples and/or top reference samples. A second reference sample line may include right reference samples and/or bottom reference samples of the current block.

Figure 18A:
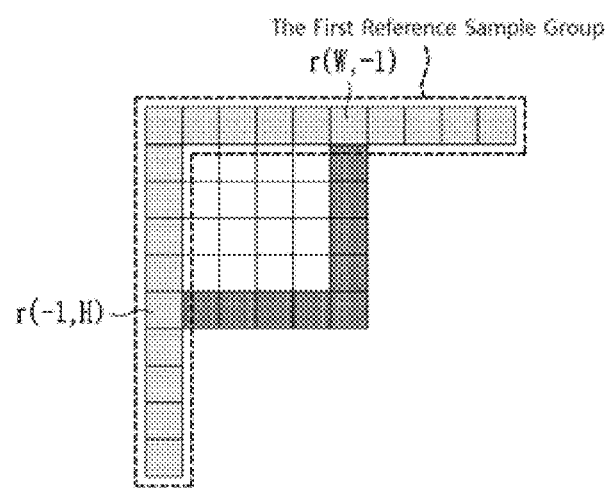
FIGS. 18A and 18B are diagrams illustrating an example of multiple reference sample lines.
Figure 18B:
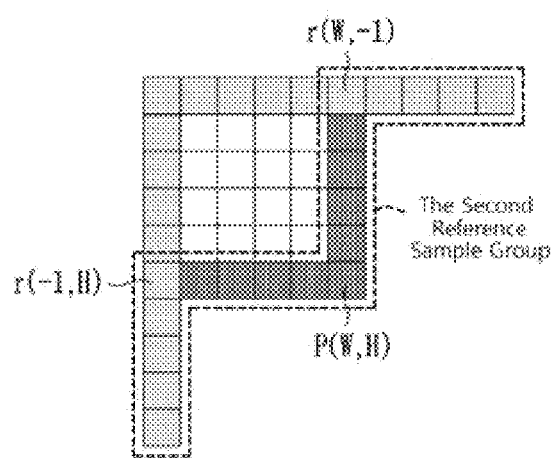

FIGS. 18A and 18B are diagrams illustrating an example of multiple reference sample lines.

A first reference sample line may include: reference samples of which the y-axis coordinate values are smaller than that of a prediction target sample included in the topmost row of the current block; and reference samples of which the x-axis coordinate values are smaller than that of a prediction target sample included in the leftmost column of the current block. A reference sample that the first reference sample line includes is referred to as a "first reference sample".

A second reference sample line may include: reference samples of which the y-axis coordinate values are greater than that of a prediction target sample included in bottommost row of the current block; and reference samples of which the x-axis coordinate values are greater than that of a prediction target sample included in the rightmost column of the current block. A reference sample that the second reference sample line includes is referred to as a "second reference sample".

For example, among top reference samples starting from P(−1, −1) to P(2W−1, −1), left reference samples starting from P(−1, −1) to P(−1, 2H−1), right reference samples starting from P(−W, −1) to P(W, H), and bottom reference samples starting from P(−1, H) to P(W, H), the first reference sample line may include the top reference samples starting from P(−1, −1) to P(2W−1, −1), and the left reference samples starting from P(−1, −1) to P(−1, 2H−1). The second reference sample line may include top reference samples starting from P(W, −1) to P(2W−1, −1), left reference samples starting from P(−1, H) to P(−1, 2H−1), right reference samples starting from P(−W, −1) to P(W, H), and bottom reference samples starting from P(−1, H) to P(W, H).

As in the example shown in FIGS. 18A and 18B, it is possible that at least one reference sample is set to be included in multiple reference sample lines. In FIGS. 18A and 18B, it is illustrated that a first reference sample line and a second reference sample line include the following in common: left reference samples of which the y-axis coordinate values are greater than that of a prediction target sample included in the bottommost row of the current block; and top reference samples of which the x-axis coordinate values are greater than that of a prediction target sample included in the rightmost column of the current block.

Differently from the shown example, it may be set that only the first reference sample line or the second reference sample line includes the left reference samples and/or the top reference samples. For example, a first reference sample line may be constructed in such a manner as to include the left reference samples, and a second reference sample line may be constructed in such a manner as to include the top reference samples.

The construction of multiple reference sample line may be determined on the basis of at least one among the size, the shape, and the intra prediction mode of the current block. For example, when the current block is a non-square block of which the width is greater than the height, a first reference sample line includes the top reference samples and a second reference sample line includes the left reference samples. Conversely, when the current block is a non-square block of which the height is greater than the width, a first reference sample line includes the left reference samples and a second reference sample line includes the top reference samples.

As in the example shown in FIGS. 18A and 18B, it is possible that at least one reference sample is set to be included in multiple reference sample lines.

The construction of the first reference sample line and the second reference sample line shown in FIGS. 18A and 18B are merely an example of the present invention. A first reference sample line and a second reference sample line may be constructed using a method different from the example shown in FIGS. 18A and 18B. For example, in the example shown in FIGS. 18A and 18B, it is shown that a first reference sample line and a second reference sample line are constructed using reference samples included in a row/column adjacent to the current block. Differently from the shown example, a first reference sample line may be set to include reference samples included in a row/column adjacent to the current block. A second reference sample line may be set to include reference samples included in a row/column not adjacent to the current block.

FIGS. 18A and 18B shows two reference sample lines, but a larger number of reference sample lines may be constructed. For example, intra prediction of the current block may be performed using at least one of three or more reference sample lines.

Whether to perform intra prediction using the second reference sample may be determined on the basis of at least one among the size of the current block, the shape of the current block, the intra prediction mode of the current block, and the position of the prediction target sample. For example, whether to use the second reference sample may be determined depending on whether the intra prediction mode of the current block is a vertical mode, a horizontal mode, or a diagonal direction mode. For example, when the intra prediction mode of the current block is a predefined mode, a prediction image of the prediction target sample is acquired on the basis of a weighted sum operation or an average operation of the first reference sample and the second reference sample. The predefined mode may include at least one among a vertical mode, a horizontal mode, a diagonal direction mode, and a planar mode. Conversely, when the intra prediction mode of the current block is not the predefined mode, a prediction image of the prediction target sample is acquired on the basis of the first reference sample.

For example, whether to use the second reference sample may be determined on the basis of whether the prediction target sample is included in a predetermined region within the current block. A prediction image of the prediction target sample included in a predetermined region within the current block may be derived on the basis of a weighting operation or an average operation between the first reference sample and the second reference sample, or may be derived on the basis of the second reference sample. Conversely, a prediction image of the prediction target sample not included in the predetermined region within the current block may be derived on the basis of the first reference sample.

Alternatively, information indicating whether to use the second reference sample may be signaled through a bitstream. The information may be a one-bit flag, an index used to determine the intra prediction mode of the current block, or the like.

Alternatively, whether to use the second reference sample may be determined on the basis of whether the second reference sample is used in the neighboring block of the current block.

At least one second reference sample may be derived on the basis of the first reference sample. For example, second reference samples may be constructed by changing the order of first reference samples. Alternatively, at least one second reference sample may be derived using a first reference sample at a predefined position.

Figure 19:
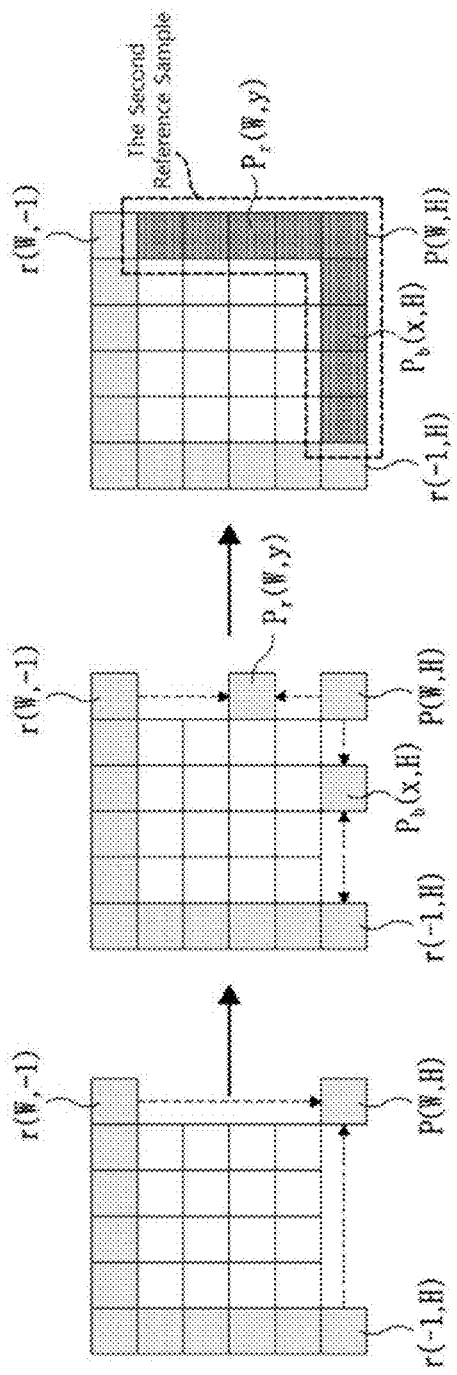
FIG. 19 is a diagram illustrating an example of deriving at least one second reference sample by using a first reference sample.

FIG. 19 is a diagram illustrating an example of deriving at least one second reference sample by using a first reference sample. FIG. 19 shows a method of deriving a right reference sample having the coordinates (W, y) (herein, y ranges from −1 to H) and a bottom reference sample having the coordinates (x, H) (herein, x ranges from −1 to W) in the second reference sample line. For convenience of description, a top/left reference sample is denoted by the letter "r", and a right/bottom reference sample is denoted by the letter "P".

First, a bottom right reference sample P(W, H) may be derived on the basis of a top right reference sample r(W, −1) and a bottom left reference sample r(−1, H) of the current block. Specifically, the bottom right reference sample may be derived on the basis of a weighted sum operation or an average operation of the top right reference sample and the bottom left reference sample. Equation 12 below represents an example of deriving the bottom right reference sample.

$$P(W, H) = \frac{W \times r(W, -1) + H \times r(-1, H)}{W + H} \quad \text{[Equation 12]}$$

As shown in Equation 12 above, a bottom right reference sample may be calculated on the basis of a weighted sum of a top right reference sample and a bottom left reference sample. Herein, a weight applied to the top right reference sample and the bottom left reference sample may be determined on the basis of the width and the height of the current block. As in the example shown in Equation 12, the weight of W/(W+H) may be applied to the top right reference sample, and the weight of H/(W+H) may be applied to the bottom left reference sample. Accordingly, when the current block is in a square shape, the weights applied to the top right reference sample and the bottom left reference sample have the same value. Conversely, when the current block is in a non-square shape, the weights applied to the top right reference sample and the bottom left reference sample have different values. However, the weight setting method shown in Equation 12 is only an example of the present invention, and the present invention is not limited thereto. In addition to the example shown in Equation 12, the weights may be determined on the basis of at least one among the size, the shape, the intra prediction mode of the current block, availability of a reference sample, availability of a neighboring block, whether a neighboring block is encoded using an intra prediction mode, and the intra prediction mode of the neighboring block.

A right reference sample between the bottom right reference sample P(W, H) and the top right reference sample r(W, −1) may be acquired by interpolating the bottom right reference sample and the top right reference sample. Equation 13 represents an example of deriving a right reference sample by interpolating a bottom right reference sample and a top right reference sample.

$$P_r(W, y) = \frac{(H - 1 - y) \times r(W, -1) + (y + 1) \times P(W, H)}{H} \quad \text{[Equation 13]}$$

As shown in Equation 13 above, a right reference sample $P_r$(W, y) (herein, y is an integer ranging from zero to the CU height (cu_height)) may be acquired through weighted prediction of a top right reference sample r(W, −1) and a bottom right reference sample P(W, H). A weight applied to the top right reference sample and the bottom right reference sample may be determined on the basis of at least one among the width, the height of the current block, and the position of the right reference sample. As in the example shown in Equation 13, the weight of (H−1−y)/H may be applied to the top right reference sample, and the weight of (y+1)/H may be applied to the bottom right reference sample. However, the weight setting method shown in Equation 13 is only an example of the present invention, and the present invention is not limited thereto. In addition to the example shown in Equation 13, the weights may be determined on the basis of at least one among the size, the shape, the intra prediction mode of the current block, availability of a reference sample, availability of a neighboring block, whether a neighboring block is encoded using an intra prediction mode, and the intra prediction mode of the neighboring block.

A bottom reference sample between the bottom right reference sample P(W, H) and the bottom left reference sample r(−1, H) may be acquired by interpolating the bottom right reference sample and the bottom left reference sample. Equation 14 represents an example of deriving a bottom reference sample by interpolating a bottom right reference sample and a bottom left reference sample.

$$P_b(x, H) = \frac{(W - 1 - x) \times r(-1, H) + (x + 1) \times P(W, H)}{W} \quad \text{[Equation 14]}$$

As shown in Equation 14 above, a bottom reference sample $P_b$(x, H) (herein, x is an integer ranging from zero to the CU width (cu_width)) may be acquired through weighted prediction of a bottom left reference sample r(−1, H) and a bottom right reference sample P(W, H). A weight applied to the bottom left reference sample and the bottom right reference sample may be determined on the basis of at least one among the width, the height of the current block, and the position of the bottom reference sample. As in the example shown in Equation 14, the weight of (W−1−x)/W may be applied to the bottom left reference sample, and the weight of the (x+1)/W may be applied to the bottom right reference sample. However, the weight setting method shown in Equation 14 is only an example of the present invention, and the present invention is not limited thereto. In addition to the example shown in Equation 14, the weights may be determined on the basis of at least one among the size, the shape, the intra prediction mode of the current block, availability of a reference sample, availability of a neighboring block, whether a neighboring block is encoded using an intra prediction mode, and the intra prediction mode of the neighboring block.

In addition to the example shown in FIG. 19, the right reference sample and the bottom reference sample may be derived by applying the embodiments described with reference to FIGS. 16 and 17 above.

Alternatively, at least one second reference sample may be derived on the basis of a pre-reconstructed or predicted sample of a block adjacent to at least one among the right side, the bottom, and the bottom right of the current block.

Alternatively, at least one second reference sample may be set to a default value predefined in the encoder and the decoder. For example, at least one among a bottom right reference sample P(W, H), a right middle sample P(W, H/2), and a bottom middle sample P(W/2, H) may be set to a default value. As in the above-described example, a second reference sample, such as a right reference sample, a bottom reference sample, and the like, may be derived using first reference samples at fixed positions, such as a top right reference sample, a bottom left reference sample, and the like. Differently from the above-described example, a second reference sample may be derived using a first reference sample other than the top right reference sample and/or the bottom left reference sample. For example, a right reference sample and a bottom reference sample may be derived using a first reference sample, such as the top middle reference sample of the current block, the left middle sample of the current block, or the like.

Alternatively, according to the intra prediction mode of the current block, a first reference sample used to derive a second reference sample may be determined. For example, a right reference sample and/or a bottom reference sample may be derived on the basis of a left reference sample and/or a top reference sample that is specified by the direction of the intra prediction mode of the current block.

Alternatively, a second reference sample may be determined using multiple left reference samples and/or multiple top reference samples. For example, at least one among a right reference sample, a bottom reference sample, and a bottom right reference sample may be generated on the basis of a weighted sum, an average value, a maximum value, or a minimum value of multiple left reference samples, or may be generated on the basis of a weighted sum, an average value, a maximum value, or a minimum value of multiple top reference samples.

Alternatively, a second reference sample may be generated by copying a first reference sample. The position of the copied first reference sample may have a value fixed in the encoder/decoder. Alternatively, the position of the copied first reference sample may be adaptively determined according to the size, the shape, the intra prediction mode of the current block, or the position of the second reference sample.

In the above-described example, although it is described that the number of bottom reference samples is W and the number of right reference samples is H, a larger number of bottom reference samples and/or right reference samples may be derived. For example, a bottom reference sample line may be constructed in such a manner that the number of top reference samples is the same as the number of the bottom reference samples. For example, the bottom reference sample line may include P(−1, H), P(2W−1, H), and reference samples therebetween. A right reference sample line may be constructed in such a manner that the number of left reference samples is the same as the number of right reference samples. For example, the right reference sample line may include P(W, −1), p(W, 2H−1), and reference samples therebetween.

A bottom reference sample of which the x-coordinate value is greater than that of a bottom right reference sample P(W, H) may be generated by extrapolating a bottom left reference sample r(−1, H) and the bottom right reference sample P(W, H), or may be generated by interpolating the bottom right reference sample P(W, H) and a bottom rightmost reference sample P(2W−1, H). The bottom rightmost reference sample may be generated by copying a top rightmost reference sample r(2W−1, −1), or may be generated on the basis of a weighted sum operation or an average operation between the top rightmost reference sample and the bottom right reference sample, or between the top rightmost reference sample and the bottom left reference sample. A right reference sample having the y coordinate greater than H may be generated by extrapolating a top right reference sample and a bottom right reference sample, or may be generated by interpolating a bottom right reference sample P(W, H) and a bottommost right reference sample P(W, 2H−1). Herein, the bottommost right reference sample may be generated by copying a bottommost left reference sample r(−1, 2H−1), or may be generated through a weighted sum operation between the bottommost left reference sample and a top left reference sample.

The first reference sample line and/or the second reference sample line may be placed in one dimension.

Intra prediction of the current block may be performed using at least one of multiple reference sample lines.

Specifically, at least one of multiple reference sample lines may be selected, and a reference sample included in the selected reference sample line may be used to calculate a prediction value of a prediction target sample.

The selection may be based on information signaled through a bitstream. The information may be index information that specifies at least one of multiple reference sample lines.

Alternatively, the selection may be based on at least one of multiple reference sample lines, and based on the size, the shape, the position, or the intra prediction mode of the current block. For example, when at least one among the width, the height, and the size of the current block is smaller than a predefined value, the first reference sample line is selected. For example, when the current block is in contact with a top boundary of a CTU or tile, the first reference sample line is selected. For example, when a predefined intra prediction mode is selected as the intra prediction mode of the current block, the first reference sample line or the second reference sample line is selected.

Alternatively, intra prediction of the current block may be performed by selecting multiple reference sample lines.

On the basis of the position of the prediction target sample and/or the intra prediction mode, a reference sample to be used to calculate a prediction value of the prediction target sample may be determined. That is, on the basis of the position of the prediction target sample and/or the intra prediction mode, a first reference sample and a second reference sample for calculating the prediction value may be determined.

A prediction value of the prediction target sample within the current block may be acquired on the basis of at least one among a first reference sample included in a first reference sample line, and a second reference sample included in a second reference sample line. The position of the first reference sample and/or the position of the second reference sample may be determined on the basis of at least one among the shape, the size of the current block, the position of the prediction target sample, and the intra prediction mode. For example, the first reference sample for the prediction target sample may be determined along the forward direction of the intra prediction mode of the current block. In addition, the second reference sample for the prediction target sample may be determined along the backward direction of the intra prediction mode of the current block.

Alternatively, the position of the second reference sample may be determined on the basis of the position of the first reference sample, or the position of the first reference sample may be determined on the basis of the position of the second reference sample. For example, at least one of reference samples that have the same x coordinate or the same y coordinate as a first basic reference sample may be determined as a second basic reference sample. Alternatively, a second basic reference sample may be determined by adding offset to the x coordinate and/or the y coordinate of a first basic reference sample. Herein, the offset may have a value fixed in the encoder/decoder. Alternatively, the offset may be adaptively determined depending on the size, the shape, or the intra prediction mode of the current block.

Alternatively, a position of a first basic reference sample and/or a second basic reference sample for calculating a prediction value may be determined on the basis of the position of the prediction target sample. For example, a reference sample having the same x coordinate or the same y coordinate as the prediction target sample may be determined as a first reference sample and/or a second basic reference sample for calculating a prediction value. Alternatively, a reference sample (that is, a reference sample that has, as the x coordinate, a result value of adding offset to the x coordinate of the prediction target sample, or a reference sample that has, as the y coordinate, a result value of adding offset to the y coordinate of the prediction target sample) at a position corresponding to a result obtained by adding or subtracting offset from the x coordinate or y coordinate of the prediction target sample may be determined as a first reference sample and/or a second reference sample. Herein, the offset may have a value fixed in the encoder/decoder. Alternatively, the offset may be adaptively determined depending on the size, the shape, or the intra prediction mode of the current block.

A prediction value of the prediction target sample may be acquired using at least one among a first prediction image acquired on the basis of the first reference sample, and a second prediction image acquired on the basis of the second reference sample. Herein, the first prediction image may be generated on the basis of the embodiments described with reference to Equation 8 to Equation 10.

The second prediction image may be generated by interpolating or copying the second reference sample specified according to the slope of the intra prediction mode of the current block. For example, Equation 15 represents an example of deriving a second prediction image by copying a second reference sample.

$$P_2(x,y) = P\_2nd\_1D(x+iIdx+1+f) \quad \text{[Equation 15]}$$

In Equation 15, $P_2(x, y)$ denotes a second prediction image, and $P\_2nd\_1D(x+iIdx+1+f)$ denotes a second reference sample.

When the slope of the intra prediction mode of the current block is unable to be represented with only one second reference sample, a second prediction image is generated by interpolating multiple second reference samples. Specifically, when the virtual angular line extending from the prediction target sample does not pass an integer-pel position (that is, a reference sample at an integer position), a second prediction image is acquired using multiple reference samples. A second prediction image for the prediction target sample may be acquired by interpolating a reference sample adjacent to the position where the virtual angular line passes, and at least one neighboring reference sample adjacent to the reference sample. Herein, the neighboring sample may be adjacent to the top, the bottom, the left side, or the right side of the reference sample. Equation 16 represents an example of acquiring a second prediction image by interpolating a second reference samples.

$$P_2(x, y) = \frac{(32 - i_{fact})}{32} \times P\_2nd\_1D(x + iIdx + 1 + f) + \frac{i_{fact}}{32} \times P\_2nd\_1D(x + iIdx + 2 + f) \quad \text{[Equation 16]}$$

A coefficient of an interpolation filter may be determined on the basis of a weight-related parameter ifact. For example, a coefficient of an interpolation filter may be determined on the basis of a distance between a fractional pel positioned on an angular line and an integer pel (that is, an integer position of a reference sample).

In Equation 16, an interpolation filter of which the number of taps is two is illustrated, but a prediction value may be calculated using an interpolation filter of which the number of taps is greater than two.

A prediction value of the prediction target sample, or a final prediction image may be acquired on the basis of at least one among a first prediction image and a second prediction image. For example, the first prediction image or the second prediction image may be determined as a prediction value of the prediction target sample. Alternatively, a prediction value of the prediction target sample may be determined on the basis of a weighted sum operation or an average operation of the first prediction image and the second prediction image. Equation 17 represents an example of calculating a prediction value of the prediction target sample on the basis of a weighted sum operation of the first prediction image and the second prediction image.

$$P(x,y) = w(x,y) \times P_1(x,y) + (1-w(x,y)) \times P_2(x,y) \quad \text{[Equation 17]}$$

In Equation 17 above, $P(x, y)$ denotes a prediction value of the prediction target sample at a position (x, y). In addition, $P_1(x, y)$ denotes a first prediction image, and $P_2(x, y)$ denotes a second prediction image. In addition, $w(x, y)$ denotes a weight applied to the first prediction image.

A weight applied to the first prediction image and the second prediction image may be determined on the basis of at least one among the position of the prediction target sample, the size, the shape, and the intra prediction mode of the current block. Equation 18 represents an example of determining a weight on the basis of the size of the current block and the position of the prediction target sample.

$$P(x, y) = \frac{((W + H) - (x + y)) \times P_1(x, y) + (x + y) \times P_2(x, y)}{W + H} \quad \text{[Equation 18]}$$

In Equation 18 above, W and H denote the width and the height of the current block, respectively, and (x, y) denote the coordinates of the prediction target sample.

According to the example shown in Equation 18 above, as the prediction target sample is closer to the top left corner of the current block, the weight applied to the first prediction image increases and the weight applied to the second prediction image decreases. Conversely, as the prediction target sample is closer to the bottom right corner of the current block, the weight applied to the second prediction image increases and the weight applied to the first prediction image decreases.

Alternatively, a weight may be derived from neighboring blocks of the current block. Herein, the neighboring blocks of the current block may include at least one among a top neighboring block, a left neighboring block, and a neighboring block adjacent to the corner of the current block (for example, a top left neighboring block, a top right neighboring block, or a bottom left neighboring block).

Alternatively, information for determining a weight may be signaled through a bitstream. The information may indicate a weight value applied to the first prediction image or the second prediction image, or may indicate a weight difference value between the current block and the neighboring block.

As in the above-described example, a method of acquiring a prediction value of the prediction target sample through a weighted sum operation or an average operation between the first prediction image and the second prediction image may be referred to as bi-directional intra prediction (bi-intra prediction).

The bi-directional intra prediction may be applied only to a partial region within the current block. The region in which the bi-directional intra prediction is applied may be pre-defined in the encoder and the decoder. For example, the bi-directional intra prediction may be applied to a predetermined-size (for example, 4×4) block adjacent to the bottom right corner within the current block.

Alternatively, the region in which the bi-directional intra prediction is applied may be determined on the basis of at least one among the size, the shape, and the intra prediction mode of the current block.

Alternatively, information (for example, information indicating the size or position of the region) for determining the region in which the bi-directional intra prediction is applied may be signaled through a bitstream.

Alternatively, the bi-directional intra prediction may be applied to the prediction target sample of which the x coordinate, the y coordinate, the sum of the x coordinate and the y coordinate, or the difference between the x coordinate and the y coordinate is equal to or greater than a predefined value.

Figure 20A:
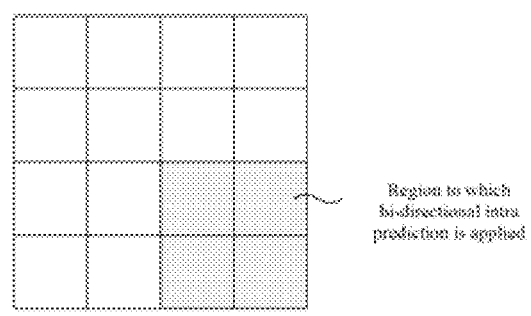
FIGS. 20A and 20B are diagrams illustrating an example of a region in which bi-directional intra prediction is applied.
Figure 20B:
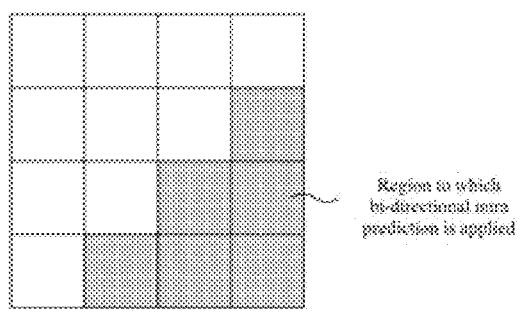

FIGS. 20A and 20B are diagrams illustrating an example of a region in which bi-directional intra prediction is applied.

As in the example shown in FIG. 20A, a region in which bi-directional intra prediction is applied may be in a quadrangular shape. Alternatively, as in the example shown in FIG. 20B, a region in which bi-directional intra prediction is applied may be in a triangular shape.

A prediction value of the prediction target sample included in the region in which bi-directional intra prediction is applied may be acquired on the basis of a weighted sum operation or an average operation of the first prediction image and the second prediction image. Conversely, a prediction value of the prediction target sample included in a region in which bi-directional intra prediction is not applied may be determined as the first prediction image or the second prediction image. Whether to set the prediction value of the prediction target sample included in the region in which bi-directional intra prediction is not applied, as the first prediction image or as the second prediction image may be determined on the basis of the size, the shape, or the intra prediction mode of the current block. Alternatively, information for selecting the first prediction image or the second prediction image may be signaled through a bitstream.

In the above-described embodiments, it is descried that multiple reference sample lines are used to perform bi-directional intra prediction. Differently from the described embodiments, it is possible that bi-directional intra prediction is performed using one reference sample line. Specifically, bi-directional intra prediction may be performed using multiple reference samples included in a first reference sample line, or bi-directional intra prediction may be performed using multiple reference samples included in a second reference sample line. For example, when the intra prediction mode of the current block is a top right diagonal direction or a bottom left diagonal direction, a first prediction image is derived on the basis of the top reference sample among the reference samples included in the first reference sample line, and a second prediction image is derived on the basis of the left reference sample. Alternatively, a first prediction image may be derived on the basis of the right reference sample among the reference samples included in the second reference sample line, and a second prediction image may be derived on the basis of the bottom reference sample. Afterward, a prediction value of the prediction target sample may be acquired on the basis of a weighted sum operation or an average operation of a first reference image and a second reference image.

The bi-directional intra prediction may be defined as an independent intra prediction mode. For example, by defining N directional prediction modes and N bi-directional intra prediction modes corresponding to the N directional prediction modes, a total of 2N+2 intra prediction modes may be defined. For example, by adding bi-directional intra prediction modes to the intra prediction modes shown in FIG. 8, a total of 68 intra prediction modes (that is, two non-directional intra prediction modes, 33 directional intra prediction modes, and 33 bi-directional intra prediction modes) may be defined. It is possible that a larger number or a smaller number of directional intra prediction modes or bi-directional intra prediction modes than 33 are used.

Alternatively, after determining the intra prediction mode of the current block, it may be determined whether to convert the determined intra prediction mode to the bi-directional prediction mode for use. For example, when the intra prediction mode of the current block is determined, information on whether to use the determined intra prediction mode as the bi-directional intra prediction mode is decoded. The information may be a one-bit flag (for example, bi_intra_flag), but no limitation thereto is imposed. The bi_intra_flag value of zero indicates that uni-directional intra prediction is performed. The bi_intra_flag value of one indicates that bi-directional intra prediction is performed. When the bi_intra_flag value is zero, a prediction value of the prediction target sample is determined using the first prediction image. Conversely, when the bi_intra_flag value is one, a prediction value of the prediction target sample is acquired on the basis of a weighted sum operation or an average operation of the first prediction image and the second prediction image.

Alternatively, depending on whether the neighboring block adjacent to the current block uses a bi-directional intra prediction mode, it may be determined whether the current block uses a bi-directional intra prediction mode. For example, when the intra prediction mode of the current block is the same as the candidate (that is, an MPM candidate) derived on the basis of the intra prediction mode of the neighboring block, whether the current block uses a bi-directional intra prediction mode is determined in the same manner as whether the neighboring block uses a bi-directional intra prediction mode.

Alternatively, whether bi-directional intra prediction is performed may be determined on the basis of the size and/or the shape of the current block. For example, it may be set that only in a 32×32-size block or larger, bi-directional intra prediction is allowed. Accordingly, when the size of the current block is smaller than a 32×32 size, bi-directional intra prediction is not applied. Conversely, when the size of the current block is equal to or greater than a 32×32 size, bi-directional intra prediction is applied.

As another example, bi-directional intra prediction may be allowed only for a square block, or bi-directional intra prediction may be allowed only for a non-square block.

Figure 21:
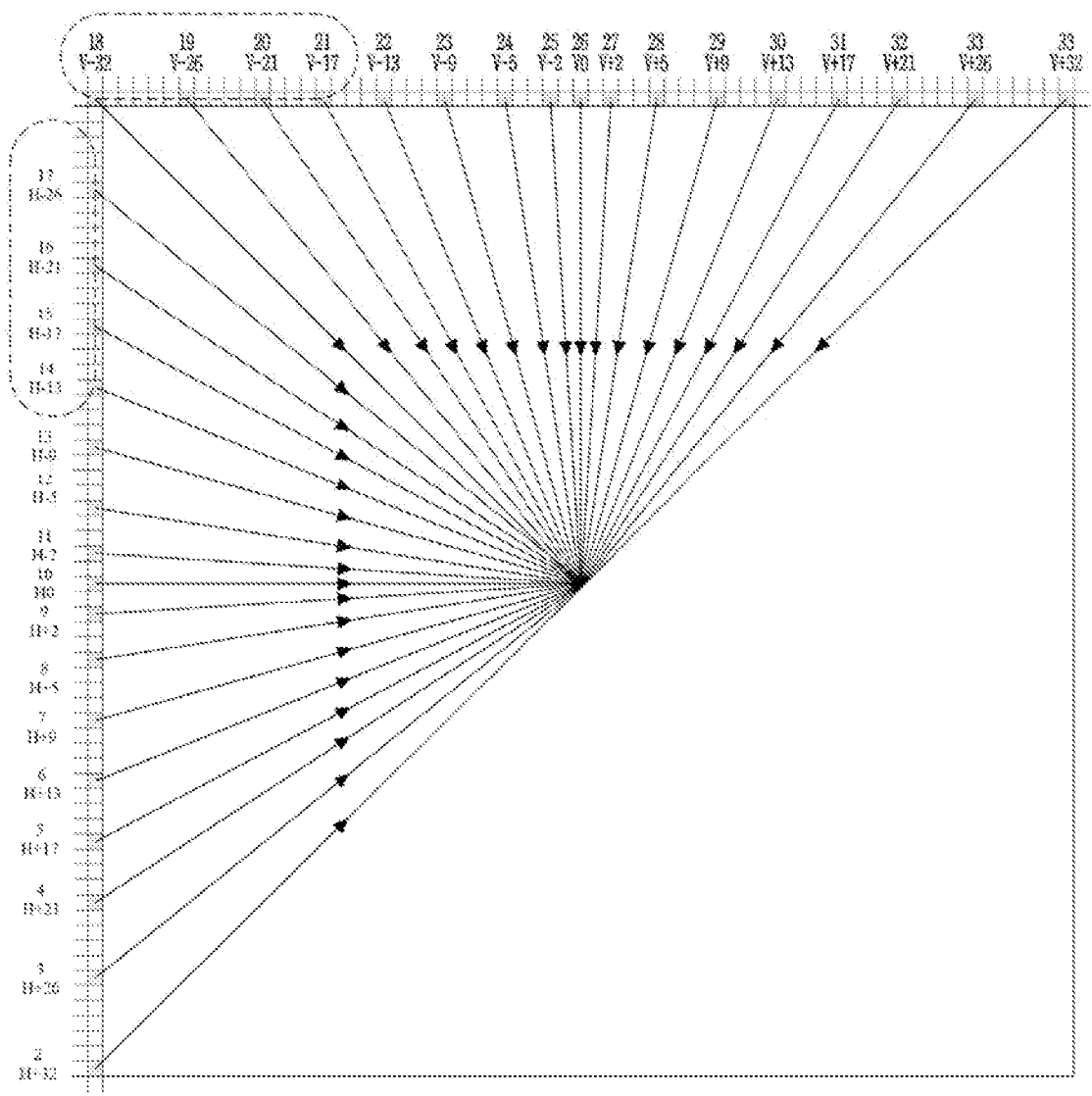
FIG. 21 is a diagram illustrating an example of a directional prediction mode indicated distinguishably in which bi-directional intra prediction is allowed.

Alternatively, bi-directional intra prediction may be applied only for some directional intra prediction modes. For example, FIG. 21 is a diagram illustrating an example of a directional prediction mode indicated distinguishably in which bi-directional intra prediction is allowed. As in the example shown in FIG. 21, it may be set that bi-directional intra prediction is allowed only for some intra prediction modes between the horizontal direction and the vertical direction. Herein, when the intra prediction mode within the range is selected, bi-directional intra prediction is performed as default. When the intra prediction mode within the range is selected, whether to perform the bi-directional intra prediction mode is determined on the basis of at least one among information parsed through a bitstream, the size, and the shape of the current block.

The intra prediction modes in which bi-directional intra prediction is allowed are not limited to the example shown in FIG. 21. The intra prediction modes in which bi-directional intra prediction is allowed may be predefined in the encoder and the decoder. Alternatively, an intra prediction mode in which bi-directional intra prediction is allowed may be determined according to the size and/or the shape of the current block. Alternatively, information for determining an intra prediction mode in which bi-directional intra prediction is allowed may be signaled through a bitstream.

At least one of multiple reference sample lines may be selected, and intra prediction may be performed using the selected reference sample line. The selection may be based on at least one among the position of the prediction target sample, the intra prediction mode of the current block, the size/shape of the current block, a partition type, scanning order, and flag information. For example, at least one of multiple reference sample lines may be selected on the basis of at least one among whether the intra prediction mode of the current block is directional, whether an index of the intra prediction mode of the current block is equal to or greater/smaller than a predefined value, whether the index of the intra prediction mode of the current block is included in a predefined range, and whether a difference value between the intra prediction mode of the current block and a predefined intra prediction mode is equal to or greater/smaller than a predefined value.

Alternatively, a reference sample line may be determined for each region or each prediction target sample.

For example, intra prediction of a prediction target sample included in a first region may be performed using a first reference sample line. Conversely, intra prediction of a prediction target sample included in a second region may be performed using a second reference sample line.

For example, the prediction target sample of which the x-coordinate value and the y-coordinate value are equal to or smaller than a predefined value may be subjected to intra prediction on the basis of the first reference sample line. Conversely, the prediction target sample of which at least one among the x-coordinate value and the y-coordinate value is greater than the predefined value may be subjected to intra prediction on the basis of the second reference sample line.

Figure 22:
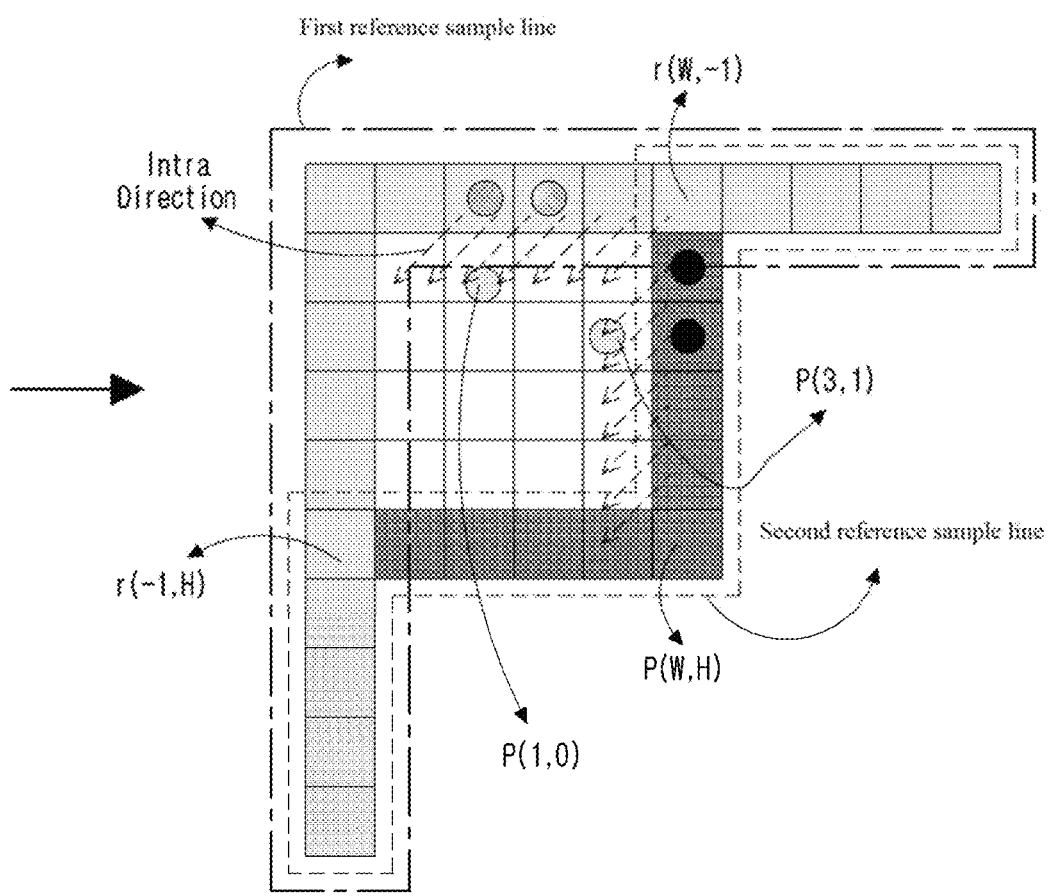
FIG. 22 is a diagram illustrating an example in which a reference sample line is determined according to a position of a prediction target sample.

FIG. 22 is a diagram illustrating an example in which a reference sample line is determined according to a position of a prediction target sample.

As in the example shown in FIG. 22, intra prediction for the prediction target sample at the position P(1, 0) may be performed on the basis of a reference sample included in a first reference sample line. Conversely, intra prediction for the prediction target sample at the position P(3, 1) may be performed on the basis of a reference sample included in a second reference sample line.

A reference sample line may be selected on the basis of the distance between the prediction target sample and the reference sample. For example, a distance (hereinafter, referred to as a first reference distance) between the prediction target sample and the first reference sample line may be compared with a distance (hereinafter, referred to as a second reference distance) between the prediction target sample and the second reference sample line, and the reference sample line having a shorter distance to the prediction target sample may be selected. That is, when a first reference sample distance is shorter than a second reference sample distance, intra prediction is performed using a first reference sample. When the second reference sample distance is shorter than the first reference sample distance, intra prediction is performed using a second reference sample.

The position of the reference sample used to calculate the distance to the prediction target sample may be determined on the basis of the intra prediction mode of the current block. For example, the reference sample may be a reference sample placed at a position where the virtual angular line extending from the prediction target sample passes, or may be a reference sample adjacent to the position. Alternatively, the reference sample may be a reference sample that has the same x coordinate as the prediction target sample, or that has the same y coordinate as the prediction target sample. Alternatively, a position of either a first reference sample or a second reference sample may be determined on the basis of the intra prediction mode of the current block, and a position of the other reference sample may be determined on the basis of a value predefined in the encoder/decoder, or the x-coordinate value or y-coordinate value the same as that of the prediction target sample.

Alternatively, the distance to the prediction target sample may be calculated using a reference sample at a predefined position. The predefined position may include at least one among the top left reference sample, the top right reference sample, the bottom left reference sample, and the bottom right reference sample.

Equation 19 shows an example of calculating a distance between the prediction target sample and the reference sample.

$$d(x,y)=|P(x,y)-ref(x_0,y_0)| \qquad \text{[Equation 19]}$$

In Equation 19 above, d(x, y) denotes a distance between a prediction target sample P(x, y) and a reference sample ref($x_0$, $y_0$). As in the example shown in Equation 19, a sample distance d(x, y) may be defined using the sum of an absolute value of an x-coordinate difference between two samples and an absolute value of a y-coordinate difference between the two samples.

The numbers of reference sample lines selected for the respective regions or prediction target samples may vary.

For example, for the prediction target sample included in a first region, intra prediction may be performed using one reference sample line (for example, a first reference sample line or a second reference sample line). Conversely, for the prediction target sample included in a second region, intra prediction may be performed using two reference sample lines (for example, a first reference sample line and a second reference sample line).

For example, intra prediction for the prediction target sample of which the x-coordinate value and the y-coordinate value are equal to or smaller than a predefined value may be performed using the first reference sample line. Conversely, intra prediction for the prediction target sample of which at least one among the x-coordinate value and the y-coordinate value is greater than a predefined value may be performed using the first reference sample line and the second reference sample line.

For example, intra prediction for the prediction target sample of which the x-coordinate value and the y-coordinate value are smaller than a predefined value may be performed using the first reference sample line. Intra prediction for the prediction target sample of which at least one among the x-coordinate value and the y-coordinate value is greater than a predefined value may be performed using the second reference sample line. Intra prediction for the prediction target sample of which the x-coordinate value and the y-coordinate value are the same may be performed using the first reference sample line and the second reference sample line.

Alternatively, by comparing the first reference sample distance and the second reference sample distance, whether to select multiple reference sample lines may be determined. For example, when the first reference sample distance is shorter than the second reference sample distance, intra prediction of the prediction target sample is performed using the first reference sample line. When the second reference sample distance is shorter than the first reference sample distance, intra prediction of the prediction target sample is performed using the first reference sample line and the second reference sample line.

When intra prediction is performed using multiple reference sample lines, a prediction value of the prediction target sample is acquired on the basis of a weighted sum operation or an average operation of multiple reference samples. An index of a reference sample line including at least one of multiple reference samples may be different from an index of a reference sample line including another reference sample.

A weight applied to each of the reference samples may be predefined in the encoder/decoder. Alternatively, a weight may be determined on the basis of the distance to the prediction target sample. Alternatively, information for determining a weight may be signaled through a bitstream. The information may be an index indicating any one of multiple weights.

Figure 23:
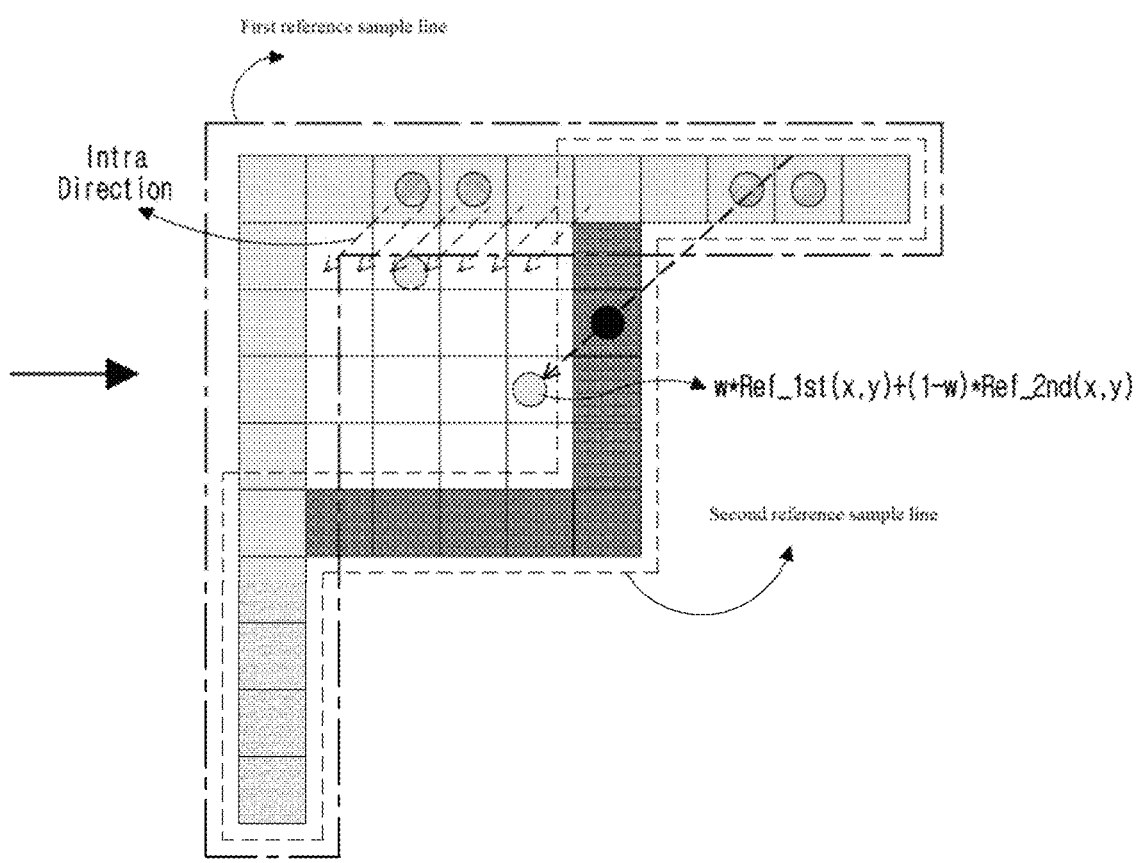
FIG. 23 is a diagram illustrating an example in which the number of reference sample lines is determined according to a position of a prediction target sample.

FIG. 23 is a diagram illustrating an example in which the number of reference sample lines is determined according to a position of a prediction target sample.

As in the example shown in FIG. 23, intra prediction for the prediction target sample at a position P(1, 0) may be performed using a first reference sample line. Conversely, intra prediction for the prediction target sample at a position P(3, 1) may be performed using a first reference sample line and a second reference sample line.

Alternatively, when intra prediction of the current block is in the intra prediction mode in a top-right direction, the distance between the position P(3, 1) of the prediction target sample and the first reference sample P(7, −1) positioned at the top right from the prediction target sample, and a distance between the position P(3, 1) of the prediction target sample and the second reference sample P(5, 2) positioned at the top right from the prediction target sample are calculated. Only a first reference sample P(2, −1) is present at the top right of the prediction target sample at the position P(1, 0). Accordingly, a prediction value of the prediction target sample may be acquired on the basis of the first reference sample. A first reference sample P(7, −1) and a second reference sample P(5, 2) are present at the top right of the prediction target sample at the position P(3, 1). Herein, a second reference distance is shorter than a first reference distance, so that a prediction value of the prediction target sample is acquired on the basis of a weighted sum operation or an average operation between the first reference sample and the second reference sample.

Equation 20 represents an example of calculating a prediction value of the prediction target sample on the basis of a weighted sum operation of the first reference sample and the second reference sample.

$$P(x,y)=w*Ref\_1st(x,y)+(1-w)*Ref\_2nd(x,y) \quad [\text{Equation 20}]$$

In Equation 20 above, P(x, y) denotes a prediction value for the prediction target sample at the position (x, y). A first reference sample for the prediction target sample is denoted by Ref_1st(x, y). A second reference sample for the prediction target sample is denoted by Ref_2nd(x, y). The weight applied to the first reference sample is denoted by w. The weight applied to the second reference sample is denoted by (1−w).

Multiple reference samples may be determined on the basis of the intra prediction mode of the current block. For example, a first reference sample and a second reference sample may be determined on the basis of a virtual angular line extending from the prediction target sample.

Alternatively, at least one of multiple reference samples may have a fixed position predetermined in the encoder/decoder. The fixed position may include at least one among a top left reference sample P(−1, −1), a top right reference sample P(W, −1), a bottom left reference sample P(−1, H), and a bottom right reference sample P(W, H).

Alternatively, at least one of multiple reference samples may be placed on the same vertical line or horizontal line as the prediction target sample. For example, a prediction value may be calculated using a reference sample that has the same x coordinate as the prediction target sample, or a reference sample that has the same y coordinate as the prediction target sample.

The bi-directional intra prediction method or the method of setting different reference sample lines/numbers of reference sample lines for the respective regions/prediction target samples described above may be performed only when the intra prediction mode of the current block is a predefined intra prediction mode. The predefined intra prediction mode may be a directional intra prediction mode or a directional intra prediction mode having a predefined index value.

The application of the embodiments described focusing on the decode process or encoding process to the encoding process or decoding process is included in the scope of the present invention. The change of the embodiments described in a predetermined order into a different order is also included in the scope of the present invention.

Although the above-described embodiments are described based on a series of steps or flowcharts, this does not limit the time-series order of the invention and may be performed simultaneously or in a different order as necessary. In addition, in the above-described embodiment, each component (e.g., a unit, a module, or the like.) constituting the block diagram may be implemented as a hardware device or software, and a plurality of components may be combined to be implemented as one hardware device or software. The above-described embodiments may be implemented in the form of program instructions that may be executed by various computer components, and may be recorded in a computer-readable recording medium. The computer-readable recording medium may include a program instruction, a data file, a data structure, etc. alone or in combination. Examples of computer-readable recording media include magnetic media such as a hard disk, a floppy disk and a magnetic tape, an optical recording media such as a CD-ROM, a DVD, and a magneto-optical media such as a floptical disk, and hardware devices specifically configured to store and execute a program instruction, such as a ROM, a RAM, a flash memory, and the like. The hardware device may be configured to operate as one or more software modules to perform the process according to the invention, and vice versa.

INDUSTRIAL APPLICABILITY

The present invention can be applied to an electronic device capable of encoding/decoding an image.

The invention claimed is:

1. A method of decoding an image, the method comprising:
deriving reference samples of a current block, the reference samples comprising top reference samples and left reference samples;
determining an intra prediction mode of the current block; and obtaining a prediction block of the current block based on the intra prediction mode and the reference samples, wherein the method further comprises determining whether to apply an update process of the prediction block to the current block or not, wherein, when it is determined to apply the update process, whether to update a prediction sample, derived by a first reference sample, in the current block by using a second reference sample or not is determined by comparing a coordinate value of the prediction sample with a first threshold value, and wherein the first reference sample is one of the top reference samples and the second reference sample is one of the left reference samples.

2. The method of claim 1, wherein an updated prediction sample is obtained based on a weighted sum operation of the prediction sample and the second reference sample.

3. The method of claim 2, wherein weights applied to the prediction sample and the second reference sample are determined based on a position of the prediction sample.

4. The method of claim 1, wherein the method further comprises:

determining a reference sample line of the current block based on index information specifying one of a plurality of reference sample line candidates, the plurality of reference sample line candidates comprising a neighboring reference sample line and non-neighboring reference sample lines, wherein when the index information is explicitly signaled via a bitstream, a reference sample line candidate who has an index identical to the index information is determined as the reference sample line of the current block, and wherein when the index information is not explicitly signaled via the bitstream, the neighboring reference sample line is determined as the reference sample line of the current block.

5. A method of encoding an image, the method comprising:

deriving reference samples of a current block, the reference samples comprising top reference samples and left reference samples;

determining an intra prediction mode of the current block; and obtaining a prediction block of the current block based on the intra prediction mode and the reference samples, wherein the method further comprises determining whether to apply an update process of the prediction block to the current block or not, wherein, when it is determined to apply the update process, whether to update a prediction sample, derived by a first reference sample, in the current block by using a second reference sample or not is determined by comparing a coordinate value of the prediction sample with a threshold value, and wherein the first reference sample is one of the top reference samples and the second reference sample is one of the left reference samples.

6. The method of claim 5, wherein an updated prediction sample is obtained based on a weighted sum operation of the prediction sample and the second reference sample.

7. The method of claim 6, wherein weights applied to the prediction sample and the second reference sample are determined based on a position of the prediction sample.

8. The method of claim 4, wherein in response that the current block adjoins a boundary of a coding tree unit, only the neighboring reference sample line is available as the reference sample line of the current block.

9. The method of claim 4, wherein in response that the current block is partitioned into a plurality of sub-blocks, only the neighboring reference sample line is available as the reference sample line of the current block.

10. The method of claim 4, wherein determining the intra prediction mode of the current block comprises:

determining whether there exists a Most Probable Mode (MPM) candidate identical to the intra prediction mode of the current block, wherein when it is determined that there exists the MPM candidate identical to the intra prediction mode of the current block, the intra prediction mode of the current block is determined to be the same as one of MPM candidates, and wherein when it is determined that there does not exist the MPM candidate identical to the intra prediction mode of the current block, the intra prediction mode of the current block is determined to be one of remaining intra prediction modes other than the MPM candidates.

11. The method of claim 10, wherein whether there exists the MPM candidate identical to the intra prediction mode or not is determined based on an MPM flag, and wherein when an index of the reference sample line is greater than a second threshold value, the MPM flag is not explicitly signaled via the bitstream, and it is inferred that the MPM flag indicates there exists the MPM candidate identical to the intra prediction mode.

12. A non-transitory computer readable medium having stored thereon a compressed video data, the compressed video data comprising:

a reference sample line index specifying a reference sample line of a current block, wherein reference samples included in the reference sample line are derived from reconstructed samples, the reference samples comprising top reference samples and left reference samples, wherein a prediction block of the current block is obtained based on an intra prediction mode of the current block and the reference samples, wherein, when it is determined to apply an update process of the prediction block to the current block, whether to update a prediction sample, derived by a first reference sample, in the current block by using a second reference sample or not is determined by comparing a coordinate value of the prediction sample with a threshold value, and wherein the first reference sample is one of the top reference samples and the second reference sample is one of the left reference samples.

* * * * *